United States Patent
Kitamura et al.

(10) Patent No.: US 7,528,538 B2
(45) Date of Patent: May 5, 2009

(54) FIBER CONTAINING CARBON, SUBSTRATE AND ELECTRON EMISSION DEVICE USING FIBER CONTAINING CARBON, ELECTRON SOURCE USING THE ELECTRON EMISSION DEVICE, DISPLAY PANEL USING THE ELECTRON SOURCE, AND INFORMATION DISPLAYING/PLAYING APPARATUS USING THE DISPLAY PANEL, AND A METHOD OF MANUFACTURING THEREOF

(75) Inventors: Shin Kitamura, Kanagawa-ken (JP); Takeo Tsukamoto, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 11/003,507

(22) Filed: Dec. 6, 2004

(65) Prior Publication Data

US 2005/0134161 A1 Jun. 23, 2005

(30) Foreign Application Priority Data

Dec. 18, 2003 (JP) ............................. 2003-420723
Nov. 12, 2004 (JP) ............................. 2004-329121

(51) Int. Cl.
*H01J 1/304* (2006.01)
*D01F 9/12* (2006.01)

(52) U.S. Cl. ................... 313/495; 423/447.1
(58) Field of Classification Search ......... 313/495–497; 423/447.1
See application file for complete search history.

(56) References Cited

U.S. PATENT DOCUMENTS 4,904,895 A 2/1990 Tsukamoto et al. ......... 313/336
5,786,658 A 7/1998 Tsukamoto et al. ......... 313/309
5,847,495 A 12/1998 Yamanobe et al. .......... 313/310
5,986,389 A 11/1999 Tsukamoto ................. 313/310
6,147,449 A 11/2000 Iwasaki et al. .............. 313/495

(Continued)

FOREIGN PATENT DOCUMENTS

EP 0 913 508 A2 5/1999

(Continued)

OTHER PUBLICATIONS

Merkulov et al., *Shaping Carbon Nanostructures by Controlling the Synthesis Process*, Applied Physics Letters, vol. 79, No. 8, (Aug. 2001) pp. 1178-1180.

(Continued)

*Primary Examiner*—Nimeshkumar D. Patel
*Assistant Examiner*—Christopher M Raabe
(74) *Attorney, Agent, or Firm*—Fitzpatrick, Cella, Harper & Scinto

(57) ABSTRACT

The invention provides a fiber containing carbon which is less deteriorated in terms of electron emission characteristic, is excellent in terms of reproducibility, and can in addition be formed at a low cost, a substrate and electron emission device using the fiber containing carbon, an electron source using the electron emission device, a display panel using the electron source, and an information displaying/playing apparatus using the display panel, and a method of manufacturing these. The manufacturing method comprises a first step of preparing a substrate (substrate 1) equipped with a catalyst (catalyst layer 3) on its surface; and a second step of causing the fiber containing carbon (carbon fiber 4) to grow using the catalyst, whereby the second step comprises, in order to decrease, from a midway point of time in this step, the growth rate at which the fiber containing carbon grows, a sub-step of controlling the growth conditions for the fiber containing carbon.

10 Claims, 15 Drawing Sheets

U.S. PATENT DOCUMENTS

| | | | |
|---|---|---|---|
| 6,171,162 B1 | 1/2001 | Iwasaki et al. | 445/6 |
| 6,179,678 B1 | 1/2001 | Kishi et al. | 445/24 |
| 6,184,610 B1 | 2/2001 | Shibata et al. | 313/309 |
| 6,231,413 B1 | 5/2001 | Tsukamoto | 445/24 |
| 6,246,168 B1 | 6/2001 | Kishi et al. | 313/495 |
| 6,288,494 B1 | 9/2001 | Tsukamoto et al. | 315/169.1 |
| 6,435,928 B1 | 8/2002 | Tsukamoto | 445/24 |
| 6,472,814 B1 | 10/2002 | Yamanobe et al. | 313/495 |
| 6,515,640 B2 | 2/2003 | Tsukamoto et al. | 345/75.2 |
| 6,608,437 B1 | 8/2003 | Kishi et al. | 313/495 |
| 6,624,589 B2 | 9/2003 | Kitamura et al. | 315/169.3 |
| 6,626,719 B2 | 9/2003 | Ono et al. | 445/24 |
| 6,628,053 B1 | 9/2003 | Den et al. | 313/310 |
| 6,673,392 B2 | 1/2004 | Lee et al. | 427/249.1 |
| 6,692,717 B1 | 2/2004 | Smalley et al. | 423/455 |
| 6,843,696 B2 | 1/2005 | Kitamura et al. | 445/24 |
| 6,848,962 B2 | 2/2005 | Kitamura et al. | 445/24 |
| 6,858,990 B2 | 2/2005 | Tsukamoto | 315/169.1 |
| 6,900,581 B2 | 5/2005 | Kyogaku et al. | 313/310 |
| 6,933,664 B2 | 8/2005 | Kitamura et al. | 313/309 |
| 2002/0031972 A1 | 3/2002 | Kitamura et al. | 445/3 |
| 2002/0047513 A1 | 4/2002 | Nomura | 313/495 |
| 2002/0057045 A1 | 5/2002 | Tsukamoto | 313/309 |
| 2002/0060516 A1 | 5/2002 | Kawate et al. | 313/495 |
| 2002/0074947 A1 | 6/2002 | Tsukamoto | 315/169.3 |
| 2002/0114949 A1 | 8/2002 | Bower et al. | 428/401 |
| 2003/0004058 A1 | 1/2003 | Li et al. | 502/258 |
| 2003/0006684 A1 | 1/2003 | Kawate et al. | 313/311 |
| 2003/0048055 A1 | 3/2003 | Ishikura et al. | 313/311 |
| 2003/0048056 A1 | 3/2003 | Kitamura et al. | 313/311 |
| 2003/0048057 A1 | 3/2003 | Oyama et al. | 313/311 |
| 2003/0057860 A1 | 3/2003 | Tsukamoto | 315/169.3 |
| 2003/0222570 A1 | 12/2003 | Kishi et al. | 313/495 |
| 2004/0060477 A1 | 4/2004 | Iwaki et al. | 106/472 |
| 2004/0063839 A1 | 4/2004 | Kawate et al. | 524/439 |
| 2004/0183422 A1 | 9/2004 | Kuroda et al. | 313/310 |
| 2004/0183428 A1 | 9/2004 | Kyogaku | 313/495 |
| 2004/0183757 A1 | 9/2004 | Oyama et al. | 345/75.2 |
| 2004/0192151 A1 | 9/2004 | Tsukamoto et al. | 445/50 |
| 2004/0245904 A1 | 12/2004 | Kitamura et al. | 313/310 |
| 2005/0032255 A1 | 2/2005 | Kitamura et al. | 438/20 |
| 2005/0059313 A1 | 3/2005 | Tsukamoto | 445/24 |
| 2005/0134161 A1 | 6/2005 | Kitamura et al. | 313/309 |
| 2005/0153619 A1 | 7/2005 | Oyama et al. | 445/50 |
| 2005/0287689 A1 | 12/2005 | Iwaki et al. | 438/22 |
| 2006/0009107 A1 | 1/2006 | Tsukamoto | 445/23 |

FOREIGN PATENT DOCUMENTS

| | | |
|---|---|---|
| EP | 1 134 304 A2 | 9/2001 |
| EP | 1134304 | 9/2001 |
| EP | 1 160 819 A2 | 12/2001 |
| EP | 1 187 161 A2 | 3/2002 |
| EP | 1 245 704 A2 | 10/2002 |
| EP | 1 291 889 A2 | 3/2003 |
| EP | 1 291 890 A2 | 3/2003 |
| EP | 1 291 891 A2 | 3/2003 |
| EP | 1 291 892 | 3/2003 |
| EP | 1 291 892 A1 | 3/2003 |
| EP | 1 443 538 A2 | 8/2004 |
| JP | 2000-57934 | 2/2000 |
| JP | 2001-43792 | 2/2001 |
| KR | 2001-0091389 | 10/2001 |
| WO | WO 00/17102 | 3/2000 |
| WO | WO 02/095097 A1 | 11/2002 |
| WO | WO 03/095089 A1 | 11/2003 |

OTHER PUBLICATIONS

Yoon, et al., *Growth Control of Single and Multi-Walled Carbon Nanotubes by Thin Film Catalyst*, Chemical Physics Letters 366 (2002) pp. 109-114.

AXIAL DIRECTION OF FIBER

GRAPHEN

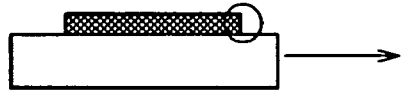
FIG. 2A  FIG. 2B
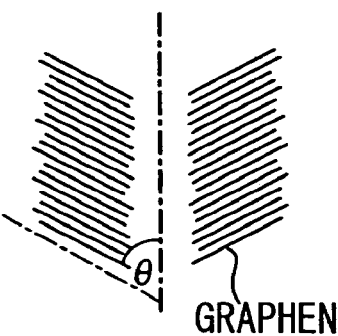
FIG. 2C1
GRAPHEN
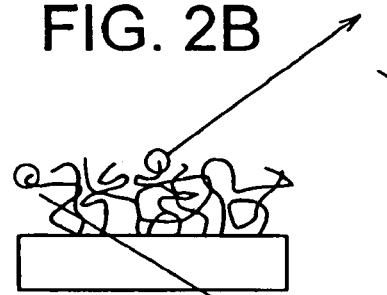
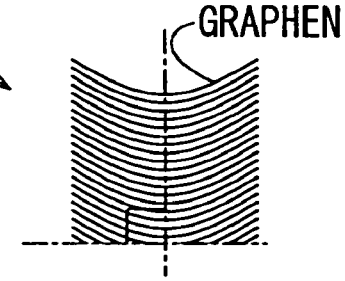
FIG. 2C2
GRAPHEN

ELECTRON
EMISSION
CURRENT
DENSITY (2)

(1)

TIME

FIBER CONTAINING CARBON, SUBSTRATE AND ELECTRON EMISSION DEVICE USING FIBER CONTAINING CARBON, ELECTRON SOURCE USING THE ELECTRON EMISSION DEVICE, DISPLAY PANEL USING THE ELECTRON SOURCE, AND INFORMATION DISPLAYING/PLAYING APPARATUS USING THE DISPLAY PANEL, AND A METHOD OF MANUFACTURING THEREOF

BACKGROUND OF THE INVENTION

1. Field of the Invention

The present invention relates to a fiber containing carbon and a method of manufacturing the same, and to an electronic device such as an electron emission device using a fiber containing carbon, a circuit board using a fiber containing carbon as a wiring, and a secondary battery (fuel cell) using a fiber containing carbon as its cathode material, and a method of manufacturing these. Also, the invention relates to an electron source prepared by disposing on a substrate a number of electron emission devices using a fiber containing carbon, and a method of manufacturing it, and to an image display apparatus, such as a flat display, using the electron source and, further, a lamp using an electron emission device and a method of manufacturing these. Also, the invention relates to an information displaying/playing apparatus, such as a flat television, which can display and play various kinds of informations or signals such as TV broadcasting signals, character broadcasting signals, satellite broadcasting signals, or cable TV broadcasting signals, and a method of manufacturing these.

2. Related Art

Attention has been drawn toward a field emission type (FE type) electron emission device that is designed in such a manner as to cause emission of electrons from the surface of a substance by utilizing the tunnel effect. In recent years, as the emitter material of the FE type electron emission device, attention has been drawn toward the one using a carbon fiber therefor, such as a carbon nano-tube, the diameter of which is of a nano-size.

As a method of manufacturing an electron emission device using a carbon fiber, there is disclosed in a Japanese official gazette of Japanese Patent Application Laid-Open No. 2001-043792 a method of manufacturing that electron emission device by adding a carbon fiber that is manufactured beforehand to a paste material, etc. and coating the resulting material onto a prescribed position to thereby locate the carbon fiber (hereinafter referred to as "the indirect location process").

Also, there is disclosed in a Japanese official gazette of Japanese Patent Application Laid-Open No. 2000-057934 a method of locating a catalyst at a desired position on a relevant substrate and, thereafter, using a chemical vapor deposition (hereinafter referred to as "the CVD process"), causing a carbon fiber to be selectively grown in an area where the catalyst is located (hereinafter referred to as "the direct location process".

Also, there is disclosed in "Shaping carbon nanostructures by controlling the synthesis process", APPLIED PHYSICS LETTERS, 20 Aug. 2001, Volume 79, Number 8, P. 1178 to 1180 by Vladimir I. Merkulov and four others an attempt made to contrive the conditions under which a plasma CVD process is executed to thereby control the shape of the relevant carbon fibers.

Also, there is a disclosure, in the specification of European Patent Application Laid-Open No. 1245704, which concerns the Raman spectrum of a carbon fiber used in the electron emission device.

SUMMARY OF THE INVENTION

In a case where using a carbon fiber as the electron emission material of a field emission type electron emission device, it is regarded as being the most important that the electron emission property is maintained as is, namely, when the same voltage is being applied, emission current is unlikely to become deteriorated over a long period of time (in other words "the life is long"). Also, it is important that the electron emission device can be formed at a low cost.

The present inventors made their whole-heated researches and studies of the matter and found out that the conditions under which carbon fibers grow are related to the stability of the emission current from an electron emission device using the carbon fibers. Specifically, they found out that, in a case where manufacturing a carbon fiber using the thermal CVD process and where, in this case, having made the heating temperature fixed, when making low the growth rate for that carbon fiber, the device tends to exhibit long life characteristics.

Here, the thermal CVD process referred to in the invention is the one that comprises, decomposing a raw material gas (a gas containing carbon) for a carbon fiber by using a heat energy of a heated substrate (and/or the catalytic action of the catalyst located on the substrate) and thereby causing the carbon fiber to be grown (deposited) on the surface (where a catalyst is disposed) of the substrate. Thus, the thermal CVD process essentially differs from the plasma CVD process.

For this reason, it is desired that the growth rate for carbon fiber be made as low as possible. However, if adopting a method of simply making the growth rate low, the problems that will be described below arise.

For example, in the thermal CVD process, as the partial pressure of the raw material gas for carbon fiber that is being supplied is made lower with the heating temperature kept constant, although the growth rate (growth speed) for carbon fiber becomes low, excessively decreasing the partial pressure of the raw material gas for carbon fiber may result in that a carbon fiber inconveniently ceases to grow from a desired area on the substrate (the reproducibility may deteriorate). The inventors of this application already confirm this finding. To explain that phenomenon, although any clear reason therefor is not proved, simply decreasing the partial pressure of the raw material gas for carbon fiber in order to make the growth rate slow becomes problematic from the viewpoint of reproducibility (uniformity).

In addition, simply making low the growth rate for carbon fiber results in that the amount of time required for manufacturing the carbon fiber gets increased, leading to the increase in the cost.

Thereupon, the present invention provides a fiber containing carbon which is less deteriorated in terms of electron emission characteristic, is excellent in terms of reproducibility, and can in addition be formed at a low cost, a substrate and electron emission device using the fiber containing carbon, an electron source using the electron emission device, a display panel using the electron source, and an information display/reproduction apparatus using the display panel, and a method of manufacturing the same.

In a case where causing the growth on a substrate of a fiber containing carbon with the catalyst particles acting as the growing nucleus by the use of a thermal CVD process, etc., the quality (degree of crystallinity) of the fiber containing carbon is related to the catalyst, growth temperature, etc. And, in a case where using the same catalyst, the same temperature, and the same manufacturing apparatus, also, the inventors of this application found out that it is possible to change the quality (degree of crystallinity) of the fiber containing carbon by controlling the growth conditions therefor (concretely the partial pressure and growth rate at the time of growth).

The invention of this application has been made on the basis of the above-described knowledge, and the method of manufacturing a fiber containing carbon according to the invention comprises a first step of preparing a substrate having a catalyst on its surface; and a second step of growing a fiber containing carbon using the catalyst, and is wherein the second step comprises a sub-step of controlling the growth condition of the fiber, in order to decrease a growth rate of the fiber.

Also, the method of manufacturing a fiber containing carbon comprises a first step of preparing a substrate having a catalyst on its surface; and a second step of growing a fiber containing carbon by heating the substrate in a carbon-containing atmosphere, and is wherein the second step includes a sub-step for decreasing the growth rate of the fiber.

The sub-step suitably includes a first sub-step of heating the substrate in a carbon-containing atmosphere in which a partial pressure of a carbon-containing gas in the atmosphere is first partial pressure; and a second sub-step of heating the substrate, after the first sub-step, in a carbon-containing atmosphere in which a partial pressure of a carbon-containing gas in the atmosphere is second partial pressure, which is lower than the first partial pressure.

The partial pressure of the carbon-containing gas is phased from the first partial pressure to the second partial pressure.

The partial pressure of the carbon-containing gas is continuously decreased from the first partial pressure to the second partial pressure.

The second partial pressure suitably is 20 Pa or less.

The temperature for heating the substrate in the second sub-step suitably is the same as the temperature for heating the substrate in the first sub-step.

The temperature for heating the substrate in the second sub-step suitably is ±10% or less in terms of its temperature fluctuation as measured from the temperature for heating the substrate in the first sub-step.

The method suitably further comprises, between the first step and the second step, a step of heating the substrate in a reducing atmosphere.

The second sub-step suitably is the one wherein, in a state where the substrate is kept heated, the partial pressure of the carbon-containing gas is decreased from the same partial pressure as the first partial pressure or a partial pressure lower than that first partial pressure to a partial pressure under which the fiber is substantially not grown.

The partial pressure under which the fiber suitably is substantially not grown is 0.0001 Pa or less.

Also, in the invention, further, in the manufacturing method for an electron emission device using a fiber containing carbon, the method of manufacturing a fiber containing carbon suitably is used to manufacture the fiber containing carbon.

In the invention, further, in the manufacturing method for an electron source having arrayed thereon multiple electron emission devices on a substrate, the method of manufacturing an electron emission device suitably is used to manufacture the electron emission device.

And, in the invention, further, in the manufacturing method for an image display apparatus having an electron source and a light emitter, the method of manufacturing an electron source suitably is used to manufacture the electron source.

In the invention, further, there is provided a method of manufacturing an information displaying/playing apparatus, the method of manufacturing an information displaying/playing apparatus being the one for manufacturing the information displaying/playing apparatus that is equipped at least a receiver unit that outputs at least one of image information, character information, and sound information contained in a broadcasting signal that has been received, and an image display apparatus connected to the receiver unit, wherein the image display apparatus suitably is manufactured using the above-described method of manufacturing.

A fiber containing carbon according to the invention is a fiber containing carbon having both ends in its longitudinal direction, and is wherein the degree of crystallinity at one of the both ends is higher than the degree of crystallinity at the other portions.

A substrate according to the invention is the one having thereon multiple fibers containing carbon, and is wherein each of the fibers has both ends in its longitudinal direction; and one of the both ends is not fixed to the substrate while the other end is fixed to the substrate, wherein a degree of crystallinity at the one end of the both ends is higher than that at the other portions.

An electron emission device according to the invention is the one comprising a fiber containing carbon having both ends in its longitudinal direction, a cathode electrode, and a control electrode that is located at a position spaced away from the cathode electrode, and is wherein one end of the fiber is not fixed to the cathode electrode, and a degree of crystallinity of the one end of the fiber containing carbon is higher than that of other portions of the fiber.

In the invention, further, there is provided an electron source, the electron source including a plurality of electron emission devices, wherein each of the plurality of electron emission devices suitably is the above-described electron emission device.

In the invention, further, there is provided a display panel, the display panel having an electron source and a screen constructed of a light-emitting member which emits light by irradiation of electrons emitted from an electron source, wherein the electron source suitably is the above-described electron source.

In the invention, further, there is provided an information displaying/playing apparatus, the information displaying/playing apparatus being the one that is comprised at least a display panel having a screen, a receiver unit that outputs at least one of image information, character information, and sound information contained in a broadcasting signal that has been received, and a drive circuit for displaying on the screen of the display panel the information that has been output from the receiver unit, wherein the display panel suitably is the above-described display panel.

In case of a device using a fiber containing carbon (carbon fiber), especially in a case where using the carbon fiber as the emitter material, using the invention enables fabricating an emitter the life of which is long with a high level of uniformity and in a short period of time.

Also, by using the invention, it is possible to manufacture a fiber containing carbon, electronic device, electron emission device, electron source, display, information-displaying/

BRIEF DESCRIPTION OF THE DRAWINGS

FIGS. 2A, 2B, 2C1, and 2C2 each are a typical view illustrating a structure of a graphite nano-fiber;

DETAILED DESCRIPTION OF THE PREFERRED EMBODIMENTS

In the present invention, the terminology "the fiber containing carbon", preferably, means "a fiber whose main component is carbon". Typically, it means a carbon fiber having a nano-scale of diameter, such as a carbon nano-tube. The fiber containing carbon (carbon fiber), typically, means the one the proportion of whose carbon is 50 atm % or more, or preferably the one the proportion of whose carbon is 70 atm % or more, or, further, more preferably the one the proportion of whose carbon is 90 atm % or more. Incidentally, in a case where the fiber containing carbon is the one that is grown using a catalyst (typically metal) such as that described later, in many cases the fiber includes therein catalyst material or carries it thereon. Therefore, the fiber containing carbon according to the invention categorically includes a fiber containing catalyst material and a fiber carrying catalyst material. And, in case of such a fiber containing carbon, as well, that includes metal therein, the fiber containing carbon according to the invention means the one the proportion of whose carbon is 50 atm % or more, or preferably the one the proportion of whose carbon is 70 atm % or more, or, further, more preferably the one the proportion of whose carbon is 90 atm % or more. Also, in a case where a fiber includes therein or carries thereon a material different from carbon, such as catalyst material, the material included or carried, compared to the carbon contained in the fiber, preferably, is 20 wt % or less in terms of its effectiveness.

Regarding the carbon fiber, there are several forms and common names. In FIGS. 1A, 1B, and 1C, and 2A, 2B, 2C1, and 2C2, there are typically illustrated examples of the form of a carbon fiber able to be used in the invention that the carbon fiber takes when it has been formed on a substrate. Also, the carbon fiber used in the invention, typically, is a nano-sized carbon fiber the diameter of which is not less than 1 nm and not more than 1 μm (preferably not less than 5 nm and not more than 100 nm).

Figure 1A:
FIGS. 1A, 1B, and 1C each are a typical view illustrating a structure of a nano-tube.
Figure 1B:
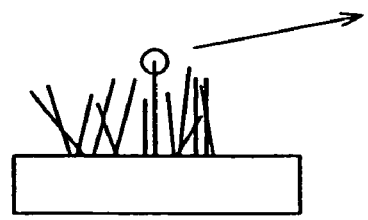

In FIGS. 1A and 2A, there are typically illustrated the formations that are seen at a optical microscope level (to 1000 times as large); in FIGS. 1B and 2B, there are typically illustrated the formations that are seen at a scanning electron microscope (SEM) level (to 30,000 times as large); and in FIGS. 1C, 2C1, and 2C2 there are typically illustrated the formations of carbon fibers that are seen at a transmission electron microscope (TEM) level (to 1,000,000 times as large).

A graphite is formed by the stacked carbon planes, each of which comprises the regular hexagons each having been formed by the carbon atoms' being convalent-bonded by $sp^2$ hybridization are disposed with no clearance therebetween, A graphite is formed by the stacked carbon planes, each of which comprises the hexagons which are regularly arranged side-by-side and formed by the carbon atoms' being covalent-bonded by sp2 hybridization. Ideally, the carbon planes are stacked so that the distance between carbon planes is kept 3.354 Å. Each of these carbon planes is called "graphen" or "graphen sheet".

Figure 1C:
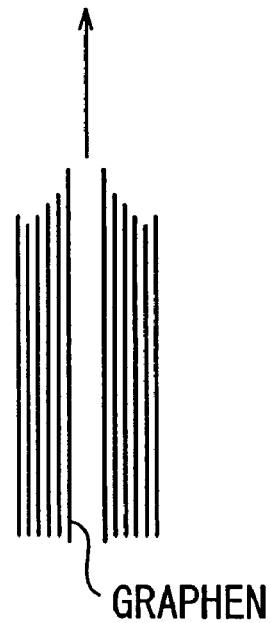

The formation of graphen wherein this graphen takes a circular-cylindrical configuration as illustrated in FIGS. 1A to 1C is called "a carbon nano-tube (CNT)". The carbon fiber that consists of a single circular-cylindrical graphen is called "a single wall nano-tube" (SWNT). And, the thing wherein a number of circular-cylindrical graphen materials are in the state of their being nested (the one having such formations as illustrated in FIGS. 1A to 1C) is called "a multi-wall nano-tube" (MWNT).

Characteristically, in the carbon nano-tube, the axial direction of the fiber and the plane of the graphen that is formed at the outermost periphery of the circular cylinder are substantially in parallel with each other (the angle defined between the axis of the fiber (the longitudinal direction of the fiber) and the graphen is approximately zero degrees).

On the other hand, the carbon fiber that is produced at a relatively low temperature by using a catalyst as in the case of the carbon nano-tube, is illustrated in FIGS. 2A to 2C2. This form of carbon fiber is constructed by a stacked graphenes. The carbon fiber that has a structure wherein the graphens have been stacked in such a manner as the plane(surface) of the graphen is kept out of parallel with the axial direction (longitudinal direction) of the carbon fiber is called "a graphite nano-fiber" (GNF).

The graphite nano-fiber whose graphen (surface of graphen) is disposed at an angle of approximately 90 degrees with respect to the axis of the fiber is called "a platelet type". The "platelet type" is of a structure wherein a single graphen sheet is stacked in large number as in the case of a trump.

On the other hand, the graphite nano-fiber whose graphen (surface of graphen) is disposed at an angle smaller than the angle of 90 degrees with respect to the axis of the fiber is called "Herinborne type". In the present invention, from the viewpoint of electron emission, in the graphite nano-fiber, typically, the angle defined between the axis of the fiber and the graphen (surface of graphen) is in a range of from 5 degrees to 90 degrees, preferably from 30 degrees to 90 degrees. As the "Herinborne type" graphite nano-fiber whose graphen surface is disposed at an angle smaller the angle of 90 degrees with respect to the axis of the fiber, there is a formation wherein non-bottomed cup-like graphen (surface of graphen) are stacked in the axial direction of the fiber, or a formation wherein graphen sheets bent in the shape of a letter V are stacked in the axial direction of the fiber.

Also, among the hollow structures of MWNT, there are the ones that have bamboo joint-like structures. However, many of these structures are approximately zero degrees in terms of the angle of the outermost peripheral graphen sheet as viewed with respect to the fiber axis. Such structures are included in a carbon nano-tube.

At around the fiber center axis of the Herinborn type structure, in some cases, the structure is hollowed; in some cases, amorphous (with an electron beam diffraction image at a TEM level no light/dark images of spots and lattice resulting from clear lattice are not seen, and only broad ring patterns, alone, or the like are seen.) carbons get clogged; or, in some cases, the graphen sheets are stacked up simply in such a manner as the graphen sheets are bent.

In FIG. 2B, there is illustrated a schematic view taken in a case where carbon fibers have grown with the linearity of each of them being bad. In the fibers formed using the manufacturing method of the invention, not all of them are bad in terms of their linearity. A graphite nano-fiber having a high level of linearity can also be obtained. Also, regarding the carbon nano-tube, as well, illustrated in FIGS. 1A to 1C, it is not always limited to the one that has a high level of linearity.

The carbon nano-tube and graphite nano-fiber that has been described above are preferably applied to the present invention from the viewpoint of the electron emission properties. However, the invention is not limited to the carbon nano-tube and graphite nano-fiber but can be applied to at least over the carbon fibers formed using the thermal CVD process. Incidentally, in the carbon fiber of the invention, it is preferable that it be a substance the length of which is 10 times or more as large as the diameter thereof (the aspect ratio is 10 or more). And, the preferable diameter of it is not less than 5 nm and not more than 100n.

The carbon nano-tube and the graphite nano-fiber differ from each other in the formation of their atomic structure according to the kind of a relevant catalyst, decomposition temperature, etc. In some cases, an intended substance having the both structures is obtained using the same catalyst and can be selected according to the temperature. In other cases, an intended substance having one of those structures is only obtained.

Hereinafter, an example of the method of manufacturing a carbon fiber according to the invention will be explained using FIGS. 3A and 3B. The materials, sizes, etc. that are shown below are illustrative of the invention and therefore the invention is not limited to these materials, sizes, etc.

Figure 3A:
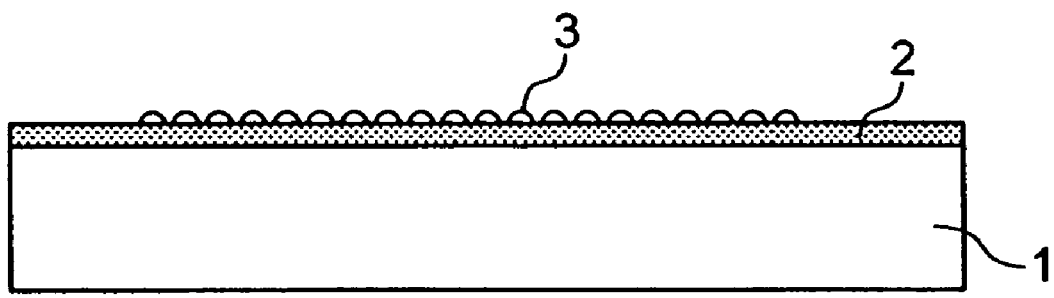
FIGS. 3A and 3B each are a typical view illustrating a process of manufacturing a carbon fiber.
Figure 3B:
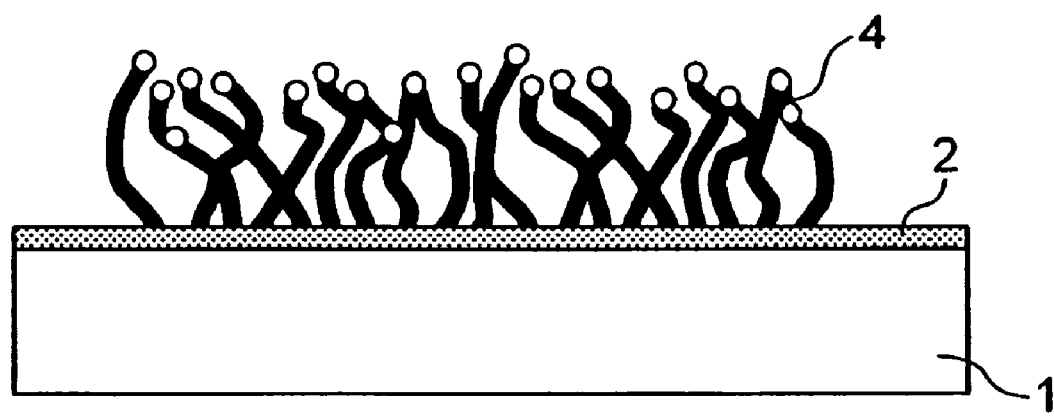

Incidentally, in FIGS. 3A and 3B, there is illustrated, with the application to an electronic device such as an electron emission device being taken into account, an example for forming a carbon fiber 4 in such a way as it is connected to a conductive layer (electrode) 2 on a substrate 1. Therefore, the conductive layer (electrode) 2 is disposed on the substrate 1.

However, in a case where solely manufacturing the carbon fiber 4 alone, although it depends on the material of the substrate 1, it is not always necessary to use the conductive layer 2.

(Step 1)

First, on the substrate 1, a catalyst layer 3 is disposed (FIG. 3A). Although in FIG. 3A the conductive layer 2 is disposed, this conductive layer 2 is not always needed. In a case where there exists no conductive layer 2, the catalyst layer 3 is formed directly on the surface of the substrate 1.

As the substrate 1, there can be used an insulative substrate such as quartz, soda lime glass, low alkali glass whose alkali metal such as Na is decreased in terms of its content, high distorted point glass used in, for example, a PDP (plasma display panel), or stainless steel.

The catalyst layer 3 preferably, as illustrated in FIG. 3A, is constructed of multiple catalyst particles.

As a method of forming multiple catalyst particles, there can be used, for example, a technique of, using a vacuum deposition device including a sputtering device, depositing on the substrate 1 a layer consisting of catalyst material to a thickness of several nano-meters or so and, thereafter, heating the substrate 1 in a reducing atmosphere and then causing aggregation of the catalyst material to obtain them.

Also, when coating on the substrate 1 a solution of metal complex containing therein a material composing the catalyst layer 3 and performing baking on the resulting substrate 1 and then performing reducing aggregation treatment on it, it is also possible to obtain the above-described catalyst particles. Furthermore, even when preparing a liquid having dispersed in a dispersion medium the catalyst particles that have been previously formed, coating it onto the substrate 1, and then desiccating or baking the resulting substrate 1, it is also possible to obtain the above-described catalyst particles. As the material for the catalyst layer 3, there can preferably be used Fe, Ni, Co, Pd, and alloys of these elements.

Although, here, an example wherein the catalyst layer 3 is formed directly on the substrate 1 is shown, in a case where using carbon fibers for an electronic device such as an electron emission device, as illustrated in FIG. 3A it is necessary to dispose the conductive layer (electrode) 2 between the catalyst layer 3 and the surface of the substrate 1. Or, in a case where the material of the substrate 1 and the material composing the catalyst layer 3 (chemically) react with each other, there are cases where between the catalyst layer 3 and the substrate 1 there is disposed an intermediate layer that comprises a material that chemically reacts with the material of the catalyst layer 3 to a smaller extent (the intermediate layer that is inactive on the catalyst) than that to which it chemically reacts with the material composing the substrate 1.

As the material that is preferable as an intermediate layer having the above-described property, there is nitride of transition metals. As the nitride of the transition metals, there can be taken up as examples titanium nitride, zirconium nitride, tantalum nitride, hafnium nitride, vanadium nitride, and chromium nitride. Also, if thin, it is also possible to use metal oxide such as titanium oxide. Regarding these intermediate layers, if the material of the conductive layer 2 and the material of the catalyst layer 3 are easy to react, that intermediate layer preferably is disposed between the conductive layer 2 and the catalyst layer 3. Of course, if the material of the conductive layer 2 is a material functioning as the above-described intermediate layer, it is not necessary to dispose the intermediate layer on the conductive layer 2.

Like this, according to a device that is used as the occasion demands, it is possible to change the disposition relationship between the substrate 1 and the catalyst and the material disposed between the substrate 1 and the catalyst.

(Step 2)

Next, by applying the thermal CVD process to the substrate 1 having the catalyst layer 3, multiple carbon fibers 4 are made to grow on the area where the catalyst layer 3 was disposed (FIG. 3B). The multiple carbon fibers 4 preferably are discretely located on the conductive layer 2 (or the intermediate layer) with gaps existing in between. By the multiple carbon fibers' 4 being disposed in such a manner as to be spaced away from one another like that, an electric field can be effectively applied to each carbon fiber 4, and therefore their electron emission property can be enhanced.

Incidentally, at the joined portion of the multiple carbon fibers 4 to the conductive layer 2 (or the intermediate layer), as well as, on the conductive layer 2 (or the intermediate layer) in the vicinity of the joined portion, there are also cases where deposited substance such as amorphous carbon come to exist there. For this reason, in such cases, it can also be said that through the execution of the above-described step 2 "a film containing therein multiple carbon fibers is formed on the conductive layer 2 (or the intermediate layer)".

The above-described thermal CVD process is concretely, while exposing the catalyst layer 3 formed in the step 1 to an atmosphere including a carbon-containing gas (while causing contact between the catalyst and the carbon-containing gas), heating the substrate 1 and thereby causing growing of the carbon fibers 4 on the area where the catalyst layer 3 was located. The reason for heating the substrate 1 is for the purpose of causing the decomposition reaction for decomposing the carbon-containing gas by the catalyst particles composing the catalyst layer 3 (in other words for the purpose of accelerating the reaction between the catalyst and the carbon-containing gas). Accordingly, if it is possible to heat the catalyst particles composing the catalyst layer 3 and thereby to make them always active (bring them to a state where their catalytic action is exhibited), it is not indispensable to heat the substrate 1 as a whole.

As the carbon-containing gas, it is possible to use, for example, hydrocarbon gas such as acetylene, ethylene, methane, propane, or propylene, carbon monoxide gas, or organic solvent gas such as ethanol and acetone. Especially, a gaseous mixture of hydrocarbon gas and hydrogen is preferable.

Figure 4:
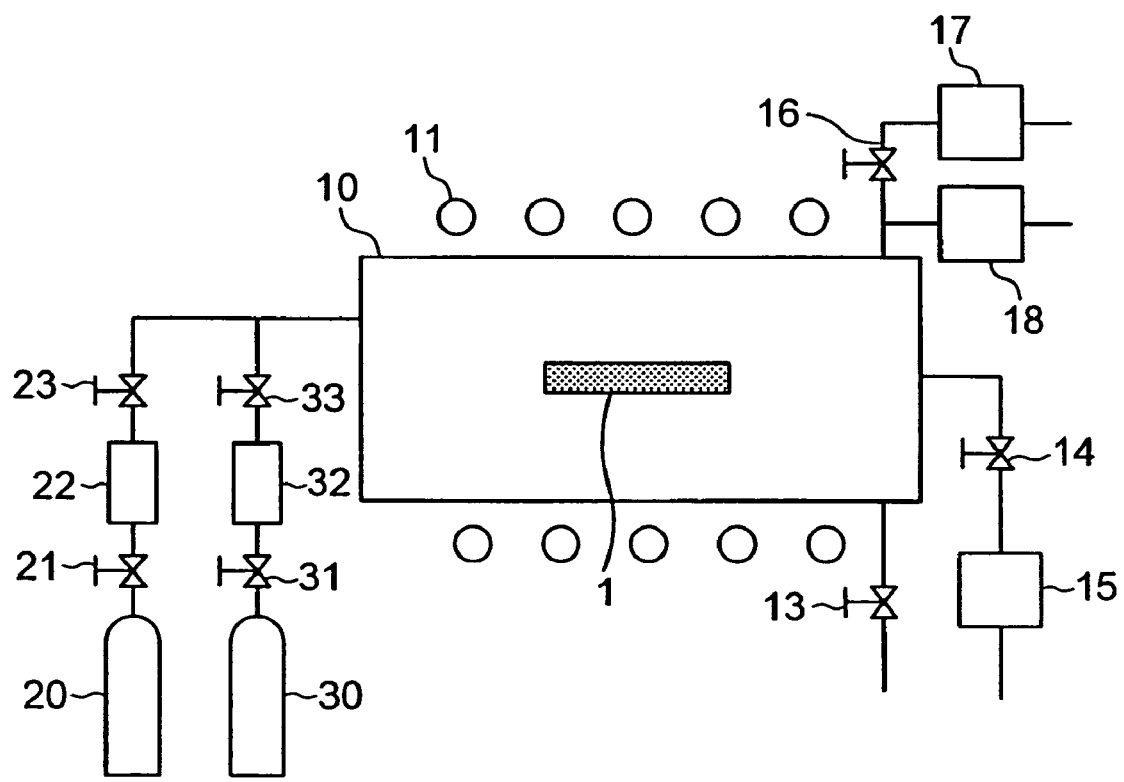
FIG. 4 is a typical view illustrating a thermal CVD manufacturing apparatus.

FIG. 4 illustrates an example of the thermal CVD apparatus for manufacturing the carbon fibers 4 that can be used in this embodiment. In FIG. 4, a reference numeral 10 denotes a reaction vessel, 11 denotes a heat source such as an infrared ray lamp or heater wires, 1 denotes the substrate on which the catalyst layer 3 that was obtained in the step 1 is located, 13 denotes a leak valve, 14, 16, 21, 23, 31, and 33 denote valves, 15 denotes a vacuum evacuation device such as a turbo-molecular pump, 17 denotes a quadruple-polar mass analyzer for analyzing the gas composition within the reaction vessel 10 and metering the partial pressures of the gas composition ingredients, 18 denotes a Baratron vacuum gage for gauging the total pressure within the reaction vessel 10, 20 denotes a cylinder for the above-described carbon-containing gas, 30 denotes a cylinder for a carrier gas consisting of a dilution gas comprising hydrogen, helium, nitrogen, and argon, or the reducing gas containing therein approximately 1% of hydrogen that has been diluted by nitrogen, helium, argon, etc., and 22 and 32 respectively denote control devices for introduction of a fixed amount of gas, each called "a mass flow controller".

The procedures in this step can be executed, for example, as follows. The sequential order taken in this step is only illustrative and the invention is not limited to that sequential order.

(Step 2-1)

First, within the reaction vessel 10, there is disposed the substrate 1 that has been formed in the step 1.

(Step 2-2)

The valve 14 is opened, then the interior of the reaction vessel 10 is evacuated, using the vacuum evacuation device 15, up to approximately $1 \times 10^{-4}$ Pa.

(Step 2-3)

Next, the valves 31 and 33 are opened, thereby the flow rate of the dilution gas (carrier gas) is controlled by the control device 32.

Incidentally, in FIG. 4, the reference numeral 20 denotes a cylinder for carbon-containing gas, and the reference numeral 30 denotes a cylinder for the dilution gas (carrier gas).

The gas flow rate and the conductance of the valve 14 are appropriately adjusted so that the total pressure within the reaction vessel 10 may become a desired pressure. The total pressure within the reaction vessel 10 is maintained preferably at not less than 133 Pa and not more than 100000 Pa.

(Step 2-4)

Subsequently, in the state formed in the step 2-3 where the conditions for the total pressure are maintained, an electric power that is applied to the heating mechanism of the heater 11 is adjusted to thereby make adjustment so that the temperature of the substrate 1 may be a fixed temperature of from 350° C. to 800° C. Through executing this step, the catalyst can be brought to a state that suits a nucleus for causing growing of the carbon fibers 4.

As the dilution gas (carrier gas) used here in this step, it is preferable that it contain therein a reducing property in order that the catalyst may be brought to a state that is more suitable for the growth of the carbon fibers 4.

By the reducing gas, the catalyst that has been oxidized can be reduced and, as a result, the catalyst can be brought to a state of its being able to exhibit the ability that is inherent in itself (a state of its more suiting the growth of the carbon fibers 4). As the reducing gas used here in this step, it is possible to use, for example, hydrogen or ammonium. Especially, hydrogen is preferable. These reducing gases can also be diluted using an inert gas such as nitrogen.

To bring the catalyst to a state of its more suiting the growth of the carbon fibers 4, it is the most preferable that, as stated in connection with the above-described step 2-3 and step 2-4, after the interior of the reaction vessel 10 is maintained under the above-described total pressure and at a state of its containing a reducing gas therein, there be started heating of the substrate 1 shown in the above-described step 2-4. A technique of making the interior of the reaction vessel 10 into a reducing atmosphere after the temperature of the substrate 1 has reached a fixed temperature from 350° C. to 800° C., also, is certainly possible to that end. However, since there is the possibility that during the temperature elevation for the substrate 1 the catalyst will be oxidized due to the existence of residual water or residual oxygen molecule in the reaction vessel 10, it is preferable that after bringing the reaction vessel 10 to a state of reducing atmosphere the temperature elevation for the substrate 1 be commenced.

This process of, after bringing the reaction vessel 10 to a reducing atmosphere, commencing the elevation of the temperature for the substrate 1 is not limited to being applied to the manufacturing method of the present invention. That process is a useful method that can also be preferably used as any method of causing growing of carbon fibers on a relevant substrate having a catalyst disposed thereon by using the CVD process.

Also, the "reaction vessel 10" referred to here in the description associated with this step means a chamber (a compartment for use as an enclosed room) that makes the interior of the "reaction vessel 10" controllable to a desired atmosphere. Although it is not always limited to the one that can be sealed, since when it is a sealable chamber (vessel) the atmosphere is easier to control, that is more preferable.

(Step 2-5)

Subsequently, while the electric power applied to the heater 11 is maintained as is and while the temperature of the substrate 1 is maintained so that it may be fixed with respect to the temperature in the above-described step 2-4, the valves 21 and 23 are opened; then carbon-containing gas is introduced while the flowrate thereof is controlled using the control device 22, and the growth of the carbon fibers 4 is commenced (the first sub-step). Here, it is also possible that the conductance of the valve 14 will be appropriately adjusted so that the total pressure within the reaction vessel 10 may have a desired level of pressure. Preferably, the total pressure of the reaction vessel 10 is maintained at not less than 133 Pa and not more than 100000 Pa. Also, at this time, preferably, the partial pressure of the carbon-containing gas that is gauged by the quadruple-polar mass analyzer 17 is not less than 0.01 Pa and not more than 200 Pa.

Incidentally, the wording "the temperature for heating the substrate 1 is fixed" in the (step 2-1) to (step 2-7) of this embodiment means a state where the fluctuation in the temperature of the substrate 1 falls within a range of ±10%, preferably a state where the temperature fluctuation falls within a range of ±5%.

(Step 2-6)

Subsequently, while the electric power applied to the heater 11 is maintained as is and while the temperature of the substrate 1 is maintained so that it may be fixed with respect to the temperature in the above-described step 2-5, the thermal CVD treatment (the second sub-step) is performed using the carbon-containing gas used in the above-described first sub-step and under a level of partial pressure that is lower than that of the carbon-containing gas when it was used in the above-described first sub-step.

Here, as the method of decreasing the partial pressure, a method of adjusting the flowrate of the carbon-containing gas, a method of adjusting the flowrate of the dilution gas, a method of lowering the total pressure, etc. are particularly effective.

By controlling the heating temperature for the substrate 1, also, it is possible to control the growth rate for the carbon fibers 4. However, in this method, it happens that the degree of crystallinity of the carbon fibers 4 greatly fluctuates, or a certain amount of time becomes necessary for performing the temperature control. For this reason, a method of controlling the partial pressure of the carbon-containing gas with the heating temperature being kept fixed as described above is preferably used.

Figure 5A:
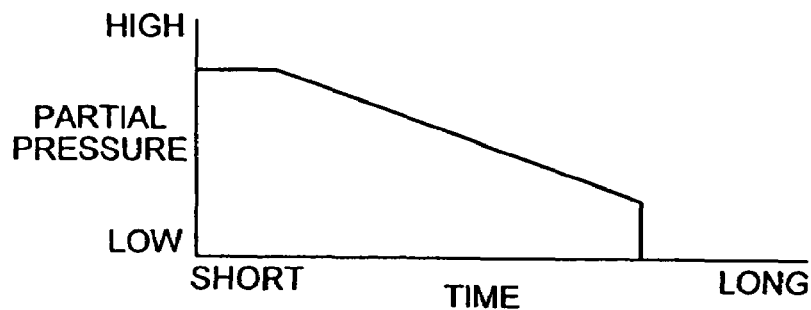
FIGS. 5A and 5B each are a typical view illustrating an example of the relationship between a gaseous partial pressure and the growth amount of time according to an embodiment of the invention.
Figure 5B:

The relationship between the partial pressure of the carbon-containing gas and the time passage is illustrated in FIGS. 5A and 5B. FIG. 5A illustrates the process of continuously decreasing the partial pressure of the carbon-containing gas from the first sub-step, while, on the other hand, FIG. 5B illustrates the manner in which the partial pressure of the carbon-containing gas is decreased stepwise from the first sub-step. In FIG. 5B, the partial pressure is decreased in one stage down to the partial pressure of the second sub-step. However, from the partial pressure in the first sub-step to the partial pressure in the second sub-step, the partial pressure can also be decreased in at least two separate stages. By decreasing the partial pressure of the carbon-containing gas in at least two separate stages, controlling the partial pressure of the carbon-containing gas in terms of time can be performed more finely.

Incidentally, when the partial pressure in the above-described first sub-step is high, it had better be so if the carbon fibers 4 can be grown at a higher rate. However, if increasing the partial pressure too much, there are cases where the amorphous components increase and in consequence the conductivity decreases or unneeded deposited substances are formed.

Also, if the partial pressure is too low, an excessively large amount of time becomes needed for obtaining an increased value of aspect ratio (i.e. the ratio of the length of the fiber to the diameter of it) of the carbon fibers 4. When there are assumed cases where they are used for electron emission device, it results that the manufacturing cost increases. Also, if the partial pressure is excessively decreased, despite the fact that the relevant area is the one with respect to which the catalyst layer 3 has been formed, there are cases where the carbon fibers 4 are grown there only discretely.

For the above-described reason, concretely, it is preferable that the partial pressure of the carbon-containing gas in the above-described first sub-step is not less than 1 Pa and not more than 200 Pa as a practical range. Also, if taking into account the amount of time needed for manufacture and actually permitted or taking it into account to cause growing with a high level of uniformity and an excellent level of reproducibility of the carbon fibers 4 in the area on the substrate 1 having the catalyst layer 3 formed thereon, it is preferable that the partial pressure of the carbon-containing gas in the second sub-step is not less than 0.01 Pa and not more than 20 Pa.

Also, in the above-described first sub-step, if taking into account the growability of the carbon fibers 4 high in uniformity and high in reproducibility, the total pressure of the system (typically the total pressure within the reaction vessel 10), preferably, is not less than 133 Pa and not more than 100000 Pa as its practical range.

Also, in the above-described second sub-step, if taking into account the growability of the carbon fibers 4 high in uniformity and high in reproducibility, the total pressure of the system (typically the total pressure within the reaction vessel 10), preferably, is not less than 133 Pa and not more than 100000 Pa as its practical range.

(Step 2-7)

Subsequently, while the electric power applied to the heater 11 is maintained as is and while the temperature of the substrate 1 is maintained so that it may be fixed with respect to the temperature in the above-described step 2-6, the partial pressure of the carbon-containing gas is decreased until the growth of the carbon fiber 4 gets approximately stopped. Here, the partial pressure under which the growth of the carbon fibers 4 is stopped, preferably, is 0.0001 Pa or less. As the means for decreasing the partial pressure of the carbon-containing gas down to approximately a level under which the growth of the carbon fibers 4 is stopped, there may be used a method wherein the valves 21 and 23 are closed to thereby simply stop the introduction of carbon gas, or the method can also be used wherein, simultaneously with stopping the introduction of the carbon-containing gas, the value 14 is opened to thereby decrease that partial pressure together with the total pressure within the reaction vessel 10.

By selecting the method of stopping the growth of the carbon fibers 4 by using a technique of, while the temperature of the substrate in the step 2-6 is maintained as is, eliminating the carbon-containing gas from within the reaction vessel 10

(gradually decreasing the partial pressure of the carbon-containing gas) like that, the fluctuation in the degree of crystallinity of the carbon fibers 4 due to the temperature's of the substrate being decreased with the carbon-containing gas remaining to exist in the reaction vessel 10 can be effectively suppressed. Therefore, the process of, after decreasing the partial pressure of the carbon-containing gas from within the reaction vessel 10 down to approximately a level under which the growth of the carbon fibers 4 is stopped, commencing lowering the temperature of the substrate 1 is a useful process that can also be preferably used as any method of causing growing of the carbon fibers on the substrate having a catalyst disposed thereon by using the CVD process, so this process is not limited to being applied to the manufacturing method of the present invention.

Also, the treatments involved in this step 2-7 up to a point of time at which the partial pressure of the carbon-containing gas within the reaction vessel 10 is decreased down to a level under which the growth of the carbon fibers 4 is stopped can also be deemed as part of the above-described step 2-6 (namely part of the above-described second sub-step).

(Step 2-8)

Finally, the substrate 1 is taken out from within the reaction vessel 10 in a state where the temperature of it has been sufficiently lowered (typically a state of its having been lowered down to an ordinary temperature), thereby the carbon fibers 4 can be obtained.

The manufacturing method for the carbon fibers 4 according to this embodiment that has been explained above comprises the first sub-step for, under the first carbon-containing gas partial pressure, causing the growth of the carbon fibers 4 from the catalyst layer (catalyst particle layer) 3 through the thermal CVD process and the second sub-step for, subsequently to the first sub-step, through the thermal CVD process, causing the growth of the carbon fibers 4 under the second carbon-containing gas partial pressure that has been lowered compared to the partial pressure of the carbon-containing gas of the first sub-step.

Incidentally, in the thermal CVD process explained in connection with the above-described step 2 (the step 2-1 to the step 2-8), an explanation has been given of the case where the carbon fibers 4 grow between the catalyst particles of the catalyst layer 3 and the substrate 1 (or the conductive layer 2 (or intermediate layer))(the case where the catalyst particles become spaced away from the substrate 1). However, according to the catalyst material (especially Fe or the like), there are also cases where, with the catalyst particles being kept staying on the substrate 1 side, the carbon fibers 4 grow on the catalyst particles. Accordingly, in a case where having used such a catalyst, there may be adopted a technique of, at an initial stage of the growth of the carbon fibers 4, setting the growth rate to be low and, after that stage, making the growth rate for the carbon fibers 4 high. If doing so, even when the catalyst is kept remaining on the substrate 1 side, it is possible to enhance the degree of crystallinity of a forward end portion (the end portion that is kept out of being fixed on the substrate 1) of the carbon fibers.

Also, in case of the invention, the above-described thermal CVD process is the most preferable as a method of causing growing of the carbon fibers. However, it is also possible to adopt other growing methods. For example, a plasma CVD process can also be used. The plasma CVD process is the one that is quite different from the thermal CVD process. In the plasma CVD process, producing plasma and applying a bias to the substrate become necessary. In the invention, as the method of decreasing the growth rate for carbon fibers when using the plasma CVD process for causing the growth of the carbon fibers, it is possible, for example, to adopt the method of, without changing the power and substrate bias necessary for the production of plasma and within a range in which plasma is stably produced, decreasing the flowrate of the raw material gas (carbon-containing gas) for carbon fibers in a mid course where the carbon fibers are being grown. Also, as another example of the methods that are peculiar to the plasma CVD process, there is a method comprising, without changing the flowrate of the raw material gas (carbon-containing gas) for carbon fibers, varying the conditions and substrate bias for the production of plasma and thereby decreasing the growth rate for carbon fibers.

Like this, in the present invention, the method of decreasing the growth rate for carbon fibers is not limited to the above-described methods but includes the ones that comprise controlling the various growth conditions for carbon fibers and that enables decreasing that growth rate.

By applying the above-described methods, etc., it is possible to obtain the carbon fibers 4 having, in each of the individual carbon fibers 4, the portions that have been produced at different growth rates and the quality of that is therefore different.

Here, part (forward end portion) of the carbon fibers 4 that are produced in the above-described second sub-step, when measured along the carbon fibers 4, has a distance, as measured from the end on a side of its being not fixed to the substrate 1, ranging from several nm to several tens of μm. Typically, that partial carbon fibers falls within a range up to 100 nm when their distance has been measured from the end on a side of its being not fixed to the substrate 1 toward the end on the opposite side. It is to be noted that this distance can arbitrarily be controlled according to the difference in time, partial pressure, etc. between the first sub-step and the second sub-step.

Regarding the carbon fibers 4 that have been obtained like that, in a case where using them as the emitter material, the above-described forward end portion can be made to grow gently(slowly). As a result of this, at the portion (forward end portion) where the carbon fibers 4 have more gently been grown they can be made into the quality (for example, the degree of crystallinity) that suits the emission of the electrons. On the other hand, regarding the portion other than the above-described forward end portion (namely the portion capable of providing a high aspect ratio that is advantageous for the emission of the electrons), it can be formed without decreasing the growth rate. As a result of this, the carbon fibers 4 that have stable electron emission and the high capability of electron emission can be manufactured readily and in a short period of time.

The partial pressure that is handled in the above-described step 2 can be gauged, for example, as follows.

The quadruple-polar mass analyzer 17, since it is operable only in a high degree of vacuum (more than approximately $1 \times 10^{-3}$ Pa of vacuum), is equipped with a differential evacuation device, and, by introducing a minute amount of gas in a low degree of vacuum (high pressure) into a space of high vacuum, its component (atomic weight) and its strength (the ionized electric current) are metered. The ionized electric current that has been metered is subjected to sensitivity correction and isotope (although the mass is the same the atomic structure is different) correction, which makes it possible to calculate a relevant partial pressure as converted. In this system involving therein the mass analyzer 17, when the pressure is high, the composition of the gas and the ratio between the composition ingredients thereof exhibit no changes even if differential evacuation is performed for analysis.

The partial pressures of the relevant composition ingredients can be determined on the basis of the above-described calculation procedure. Namely, under the assumption that the sum total of the partial pressures as conversion-calculated of the dilution gas (e.g. hydrogen, helium, nitrogen, etc.) partial pressure within the reaction vessel 10, carbon-containing gas (e.g. acetylene, ethylene, etc.) partial pressure, minute-amount-of-water partial pressure, etc. be the total pressure, the respective actual partial pressures within the reaction vessel 10 can be determined. Also, the total pressure can be measured using a Baratron vacuum gage 18.

The carbon fibers 4 that have been formed according to the above-described procedure of the present invention each have both end portions as viewed in their longitudinal direction (their axial direction). And, these both end portions comprise the end on a side fixed to the substrate 1 (typically the portion covering 100 nm from the end on a side fixed to the substrate toward the end on a side kept out of being fixed to the substrate 1) and the end on a side being not fixed to the substrate 1 (typically the portion covering 100 nm from the end on a side being not fixed to the substrate 1 toward the end on a side fixed to the substrate 1). Incidentally, in this invention, "the end on a side being not fixed to the substrate" may be paraphrased as "free end". And "the end on a side fixed to the substrate" may be paraphrased as "fixed end".

And, the degree of crystallinity at the end of the carbon fibers 4 on a side being not fixed to the substrate 1 is higher than that at the other portion (typically the portion covering 100 nm from the end on a side fixed to the substrate 1 side) of the carbon fibers 4. This difference in the degree of crystallinity can be defined according to, for example, the distribution characteristic of the intensity of the Raman scattered light (the Raman spectrum).

Figure 6:
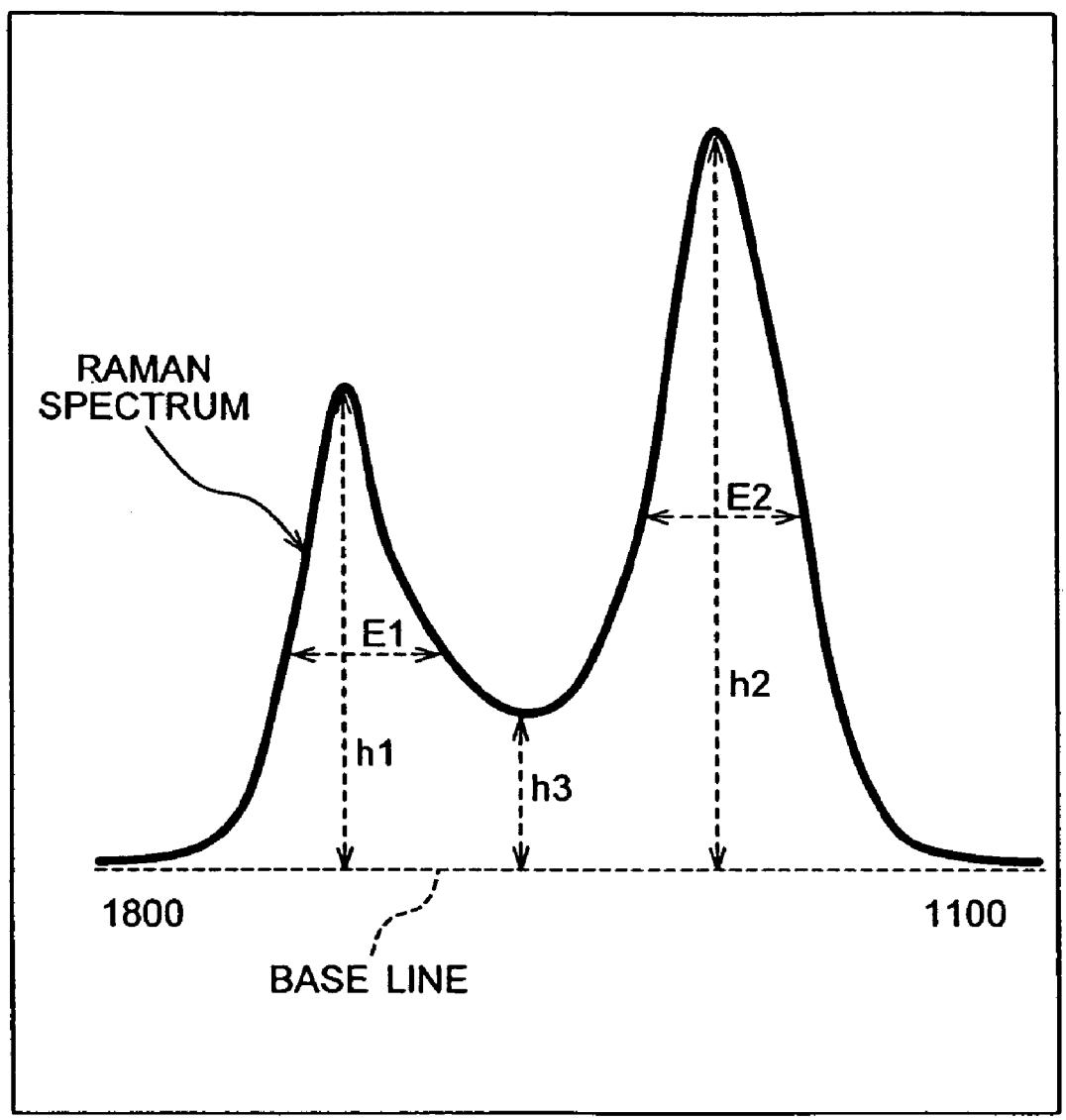
FIG. 6 is a typical view illustrating an example of the Raman spectrum.

The Raman spectrum can be obtained by radiating a laser light having a wavelength of 488 nm (the laser light may have a wavelength of 514.5 nm) onto the carbon fibers 4. In FIG. 6, the Raman spectrum is typically illustrated. Incidentally, in FIG. 6, the abscissa axis represents the getting-out-of-position from the Rayleigh scattered light in terms of vibrations number (called "the Raman shift") and the ordinate axis represents the intensity of the Roman scattered light.

To obtain the Raman spectrum, there is measured the intensity of the Raman scattered light over a range of at least 700 kaysers ($cm^{-1}$) or more, preferably 1500 kaysers ($cm^{-1}$). Incidentally, the base intensity (base line) can be determined as the occasion demands (although here the approximation to straight line is made, the method for determining the base line is not limited to this way of determining but there are also cases where the base intensity is determined as being the one shaped like a circular arc.). Incidentally, the base line, typically, can be represented by a straight line connecting the intensity of the Raman scattered light at 1100 $cm^{-1}$ and the intensity of the Raman scattered light at 1800 $cm^{-1}$.

And, from the Raman spectrum, it is possible to determine the difference portion (peak height h2) between the maximum value of the Raman scattered light intensity in a band of D (1355±10 kaysers) and the base line, as well as the width at the height corresponding to half of the peak height h2 (the width at half peak value, in other words, FWHM (full width at half maximum) E2, and the difference portion (peak height h1) between the Raman scattered light intensity and the base line in a band of G (1580±10 kaysers) as well as the width at the height corresponding to half of the peak height h1 (the width at half peak value E1). Further, from the Raman spectrum, it is possible to determine the difference portion (h3) between a local minimum value of the Raman scattered light intensity, at the value between the band of G and the band of D, and the base line.

Using the above-described h1, h2, h3, E1, and E2, it is possible to define the degree of crystallinity of the carbon fibers 4.

In the carbon fibers 4 obtained using the manufacturing method of the present invention, when, with the use of the above-described Raman intensity distribution characteristic and under the same evaluation conditions, measuring the Raman spectrum at each of the end on a side being not fixed to the substrate 1 of the carbon fibers 4 (typically the portion covering up to 100 nm from the end on a side being not fixed to the substrate 1) and the other portion (typically the portion covering up to 100 nm from the end on a side fixed to the substrate 1, or the center of the carbon fiber 4 in its lengthwise direction), it is admitted that between the h3 value ($h3_1$) corresponding to the end on a side being not fixed to the substrate 1 and the h3 value ($h3_2$) corresponding to the other portion there exists the relationship of ($h3_2$–$h3_1$)/$h3_2$× 100≧20 (%). Since in many of the cases where having caused the growth of carbon fibers 4 using the thermal CVD process it is admitted that the difference in the growth parameter is reflected by the difference in the height h3, making comparison between the h3 values would provide a greatest convenience. Incidentally, the smaller the value of the h3 is, the higher the degree of crystallinity is.

Incidentally, according to the disposition density, etc. of the catalyst particles, there are also cases where the carbon fibers 4 closely grow on the substrate 1 in large number (in such a manner as they are closely entangled together). In those cases, sometimes, difficulty is encountered in finding out the end of a single carbon fiber 4 on a side being not fixed to the substrate 1 (typically the portion covering up to 100 nm from the end on a side being not fixed to the substrate 1 toward the end on a side fixed to the substrate 1) and the other portion (typically the portion covering up to 100 nm from the end on a side being fixed to the substrate 1 toward the end on a side being not fixed to the substrate 1, or the center of the carbon fiber 4 in its lengthwise direction).

In such cases, in the present invention, since basically the growth conditions for every carbon fiber 4 can be thought to be equal, there may be compared the Raman spectrum at the end, of a given carbon fiber 4, on a side being not fixed to the substrate 1 (typically the portion covering up to 100 nm from the end on a side being not fixed to the substrate 1) and the Raman spectrum at the other portion of another carbon fiber (typically the portion covering up to 100 nm from the end on a side being fixed to the substrate 1, or the center of the carbon fiber 4 in its lengthwise direction) This comparison may of course be made between the average of the Raman spectrums at the ends, of several carbon fibers 4, on a side being not fixed to the substrate 1 (typically the portions covering up to 100 nm from the ends on a side being not fixed to the substrate 1) and the average of the Raman spectrums at the other portions, of several other carbon fibers (typically the portions covering up to 100 nm from the ends on a side being fixed to the substrate 1, or the center of the carbon fiber 4 in its lengthwise direction).

Also, in the carbon fiber 4 obtained using the manufacturing method of the invention, between the h1 value ($h1_1$) and/or h2 value ($h2_1$) at the end on a side being not fixed to the substrate 1 and the h1 value ($h1_2$) and/or h2 value ($h2_2$) at the other end, it is admitted that the relationship of ($h1_1$–$h1_2$)/$h1_1$×100≧20 (%) and/or ($h2_1$–$h2_2$)/$h2_1$×100≧20 (%) exists. The greater the h1 value and/or h2 value is, the higher the degree of crystallinity is.

Also, in the carbon fiber 4 obtained using the manufacturing method of the invention, between the E1 value ($E1_1$) and/or E2 value ($E2_1$) at the end on a side being not fixed to the substrate 1 and the E1 value ($E1_2$) and/or E2 value ($E2_2$) at the other end, it is admitted that the relationship of ($E1_2-E1_1$)/$E1_2\times100\geqq10$ (%) and/or ($E2_2-E2_1$)/$E2_2\times100\geqq10$ (%) exists. The smaller the E1 value ($E1_1$) and/or E2 value ($E2_1$) is, the higher the degree of crystallinity is.

Incidentally, in a carbon nano-tube that has a circular-cylindrical hexagonal net surface of carbon, the Raman spectrum thereof, a clear peak is also observed in a range, as well, of 173 kaysers±10 kaysers. Therefore, in a case where the carbon fibers 4 manufactured using the manufacturing method of the invention is a carbon nano-tube, the peak heights (h4) and the widths-at-half-value (E4) in the range of 173 kaysers±10 kaysers are measured at the end, of the carbon nano-tube, on a side being not fixed to the substrate 1 as well as at the other portion, of it, on the opposite side. By doing so, it is possible to determine the degree of crystallinity by comparing the relative (fellow) peak heights and comparing the relative (fellow) half-value widths. Regarding the degree of crystallinity in the range of 173 kaysers±10 kaysers, between the h4 value ($h4_1$) at the end on a side being not fixed to the substrate 1 and the h4 value ($h4_2$) at the other portion, it is admitted that there exists the relationship of ($h4_1-h4_2$)/$h4_1\times100\geqq20$ (%). The greater the h4 value is, the higher the degree of crystallinity is. Also, regarding the half-value width, between the E4 value ($E4_1$) at the end on a side being not fixed to the substrate 1 and the E4 value ($E4_2$) at the other portion, it is admitted that there exists the relationship of ($E4_2-E4_1$)/$E4_2\times100\geqq10$ (%). The smaller the E4 value is, the higher the degree of crystallinity becomes.

Figure 7A:
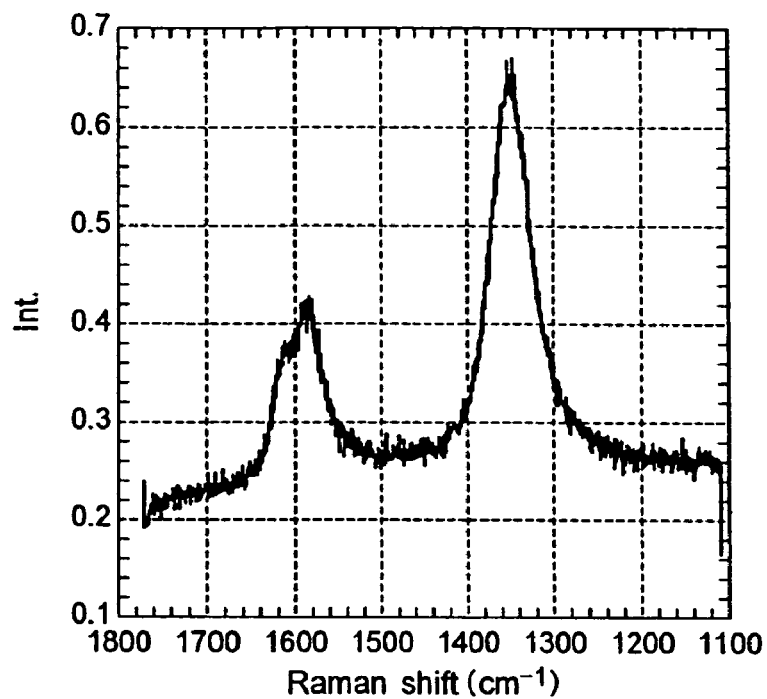
FIGS. 7A and 7B each are a typical view of the Raman spectrum of a carbon fiber that can be fabricated with a manufacturing method of the present invention.
Figure 7B:
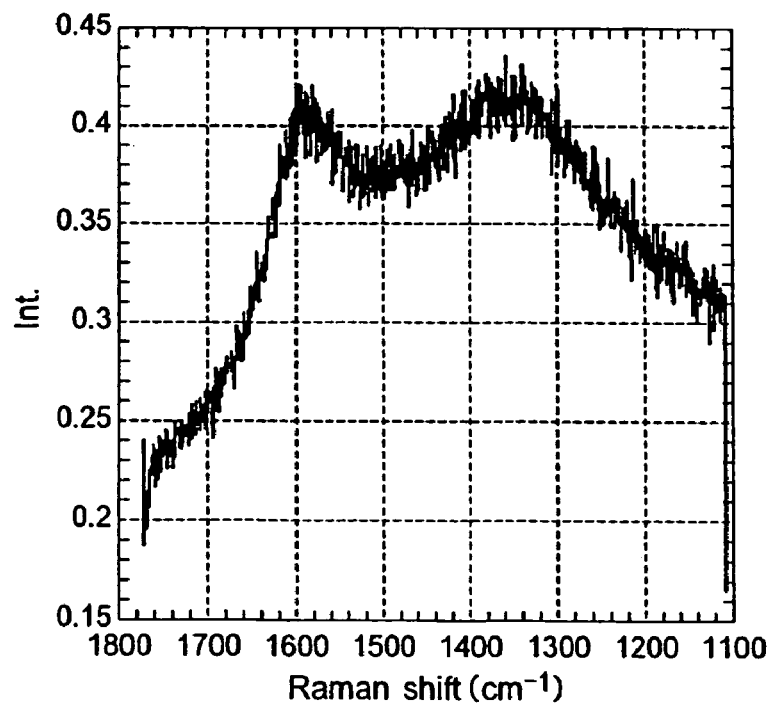

Examples of the Raman spectrums resulting from the graphite nano-fibers formed with the manufacturing method for carbon fibers 4 of the invention are illustrated in FIGS. 7A and 7B.

The Raman spectrum that is obtained from the end of the graphite nano-fiber 4 on a side being not fixed to the substrate 1 is as illustrated in FIG. 7A, while the Raman spectrum that is obtained from the end on a side fixed to the substrate 1 is as illustrated in FIG. 7B. Here, when eliminating the base line by making approximation to a straight line of the noises between 2500 and 500 kaysers, the h1, h2, h3, E1, and E2 values explained using FIG. 6 are as shown in Table 1 below. It is to be noted that the h1, h2, and h3 values shown in Table 1 are standardized setting the h1 peak intensity obtained in a band of G as 1.

TABLE 1

|  | h1 | h2 | h3 | E1 (kayser) | E2 (kayser) |
|---|---|---|---|---|---|
| The end on a side being not fixed to substrate (free end) | 1 | 2.4 | 0.35 | 70 | 60 |
| The end on a side fixed to substrate (fixed end) | 1 | 0.9 | 0.77 | 380 | 230 |
| The difference between the fixed end and the free end, expressed in percentage | 0% | 63% | 55% | 82% | 74% |

As will be apparent from the difference expressed in percentage ((maximum−minimum)/maximum), shown in Table 1, the end of the carbon fiber 4 on a side fixed to the substrate 1, and the end thereof being not fixed to the substrate are admitted to have a clear difference therebetween in terms of the h2, h3, E1, and E2 values. At the end on a side being not fixed to the substrate 1, there can be confirmed the enhancement in the crystallization.

On the other hand, in the mid-course of causing the growth of the carbon fiber, in order to decrease the growth rate for fiber, in case of a fiber obtained with the conventional method keeping out of use a technique wherein the growth conditions for fiber are not controlled, it was confirmed that the end of the carbon fiber on a side kept fixed to the substrate and the end thereof on a side not fixed to the substrate each got out of the above-described range, and approximately the same Raman spectrums were obtained therefrom.

Incidentally, the above-described Raman spectrums can be measured with the use of a system (e.g. the "Nanofinder" <trademark> produced by Tokyo Instrument, Inc.) that enables simultaneous execution of both the AFM measurement and the Raman measurement. In an ordinary Raman measurement, since even when the relevant light has been restricted using an optical lens it inconveniently spreads to approximately the wavelength of an ordinary light, the resulting resolving power is approximately 0.5 μm. However, by emitting the light guided to within a probe of AFM from a forward end of the probe (by using the proximity field light), it is possible to radiate onto the carbon fiber a light that has been restricted to a nano-sized light. Then, the light coming back from the carbon fiber is measured through the probe of the AFM. By doing so, it becomes possible to perform Raman spectrum measurement the post-measurement Raman spectrum of which has a resolving power the value of which is equal to or smaller than the wavelength of an ordinary light.

Figure 8B:
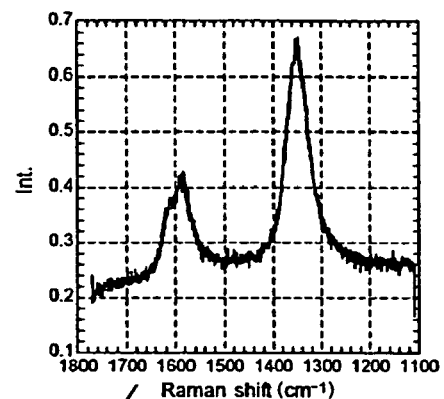
FIG. 8A is a typical view illustrating the change with age of the Raman spectrum and electron emission current and FIGS. 8B and 8C each are a typical view of the Raman spectrum of a carbon fiber.
Figure 8A:
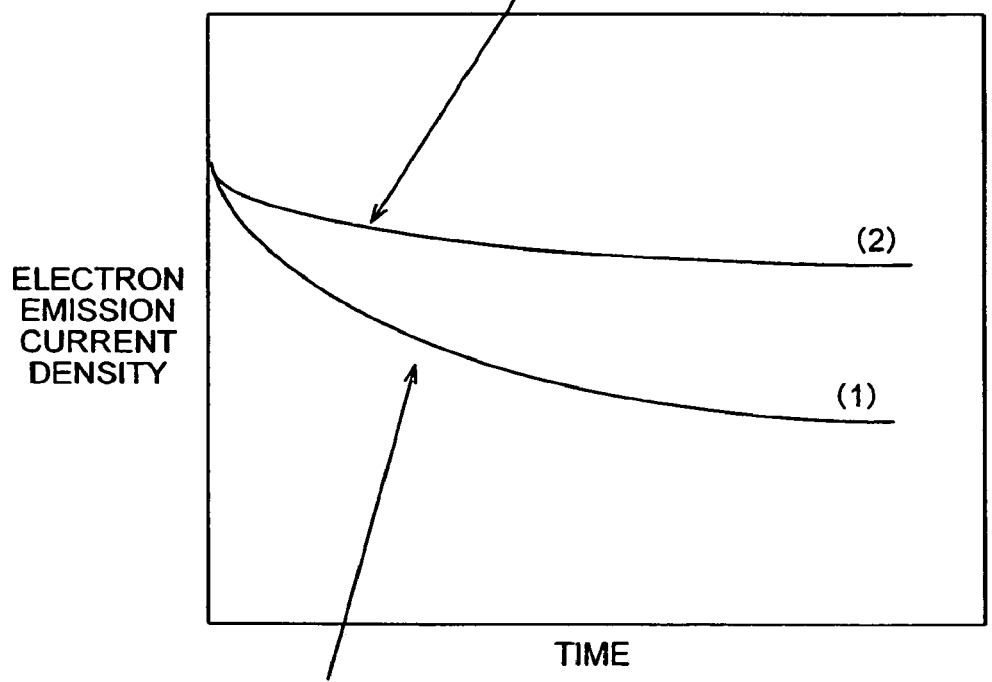
Figure 8C:
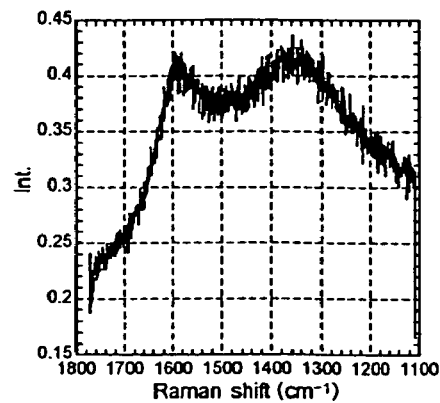

Also, by disposing an anode electrode in such a way as it opposes a cathode electrode that is equipped with the carbon fiber (the carbon fiber wherein the Raman spectrum resulting from the end on a side of the carbon fiber on a side kept fixed to the substrate is FIG. 7B; and the Raman spectrum resulting from the end of it on a side being not fixed to the substrate is FIG. 7A) and then applying a DC voltage between the cathode electrode and the anode electrode, the evaluation of the electron emission characteristic was conducted. Also, in accordance with the same procedure, there was evaluated the electron emission characteristic of the carbon fiber (the carbon fiber wherein the Raman spectrums resulting from the end on a side of the carbon fiber kept fixed to the substrate and the end of it on a side being not fixed to the substrate each are FIG. 7B) that was formed without controlling the growth conditions for decreasing the growth rate for carbon fiber. The outline of the change with age of the electron emission current density, obtained as a result of that, is illustrated in FIG. 8A. In the carbon fiber ((2) of FIG. 8A) formed using the technique of the invention, the deterioration with age of the electron emission current density can be more suppressed than in the carbon fiber ((1) of FIG. 8A) formed without controlling the growth conditions for decreasing the growth rate for carbon fiber. And, the amount of time that is needed for the growth of the carbon fiber almost doesn't change.

On the other hand, in the carbon fiber (the carbon fiber wherein the Raman spectrums resulting from the end on a side of the carbon fiber kept fixed to the substrate and the end of it on a side being not fixed to the substrate each are FIG. 7A) formed without controlling the growth conditions for decreasing the growth rate for carbon fiber, the manner in which the electron emission current density is deteriorated with age was the same as that in case of the (2) of FIG. 8A. However, the growth of this carbon fiber needed an amount of time that is four times or more as large as the amount of time that is needed when growing the carbon fiber according to the manufacturing method of the invention.

Although the degree of crystallinity at the end of the carbon fiber on a side being not fixed to the substrate becomes high if making low the growth rate (growth rate) for carbon fiber, since limitation is also imposed on the amount of time that is permitted as the one for manufacture, it is regarded as being practically reasonable that the relationship of $h2_1 \geq h1_1 \times 1.5$, $h3_1 \leq h1_1/2$, $E1_1 \leq 100$ kaysers, and $E2_1 \leq 100$ kaysers is satisfied, thereby it is possible to maintain excellent electron emission property over a long period of time.

Hereinafter, a concrete example of the method of manufacturing an electron emission device, according to the invention, that uses a carbon fiber will be explained using FIGS. 9A, 9B, and 10A to 10C. Although an example of a lateral type electron emission device is explained here, it is also possible to use this method of the invention for a so-called "vertical type" electron emission device as well. Incidentally, since compared to the vertical type electron emission device the lateral type electron emission device is simpler to manufacture and, in addition, the capacity component at the time of driving it is less. For the later reason, it is possible to drive it with a high speed, so the lateral type is a preferable form of electron emission device.

Also, the "lateral type electron emission device" means an electron emission device of the form wherein electric field is formed in a direction that is substantially parallel with the surface of the substrate and, by this electric field, electrons are drawn out from the carbon fibers. On the other hand, the "vertical type electron emission device" means an electron emission device of the form wherein electric field is formed in a direction that is substantially perpendicular to the surface of the substrate and, by this electric field, electrons are drawn out from the carbon fibers. A so-called "spint type" electron emission device is included under the category of the vertical type electron emission device.

Figure 11:
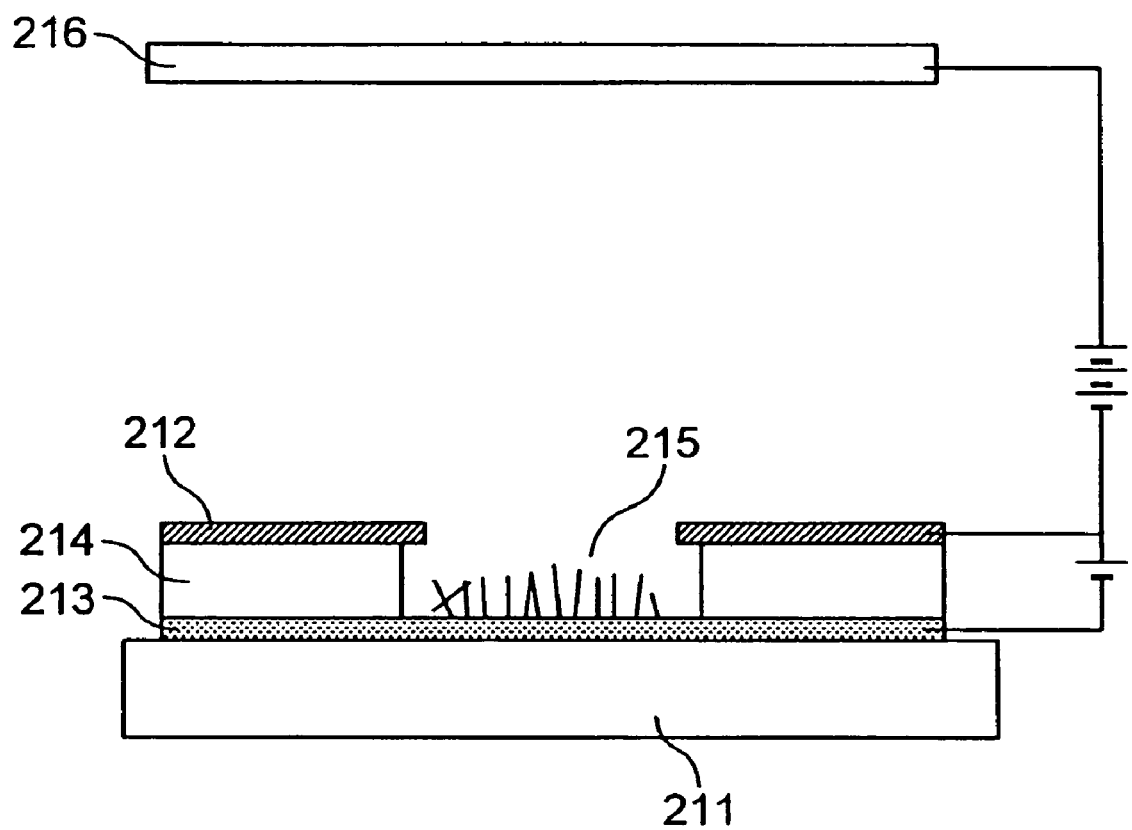
FIG. 11 is a typical view illustrating another formation of the electron emission device having a carbon fiber.

Also, although the vertical type electron emission device illustrated in FIG. 11 is the one that includes a cathode electrode 213 and a control electrode 212 (this is called a triode (3-terminal) structure in a state of its including an anode electrode 216 as well.), since the carbon fiber 215 can emit electrons with a low electric-field intensity, the invention can also be applied to the vertical type electron emission device, as well, of a structure having omitted therefrom the control electrode 212 and insulating layer 214 illustrated in FIG. 11. Namely, the invention can be applied to the arrangement (this is called a diode (2-terminal) structure in a state of its including the anode electrode 216), as well, wherein an electron emission device is constructed of the cathode electrode 213 disposed on the substrate 211 and the carbon fiber 215 disposed thereon.

Also, in the above-described triode structure, as illustrated in FIG. 11, there are also cases where the control electrode 212 functions as a so-called "gate electrode" (the electrode for drawing electrons out from the carbon fibers 215). However, since as stated before the carbon fibers 215 enable electron emission therefrom with a low electric field, there are also cases where drawing-out of electrons from the carbon fibers 215 is performed with the anode electrode 216 and the control electrode 212 is used to perform the modulation of the emission amount of electrons from the carbon fibers 215, the halting of the electron emission, or the shaping of the electron beams emitted such as the convergence of the electron beam emitted.

Figure 9A:
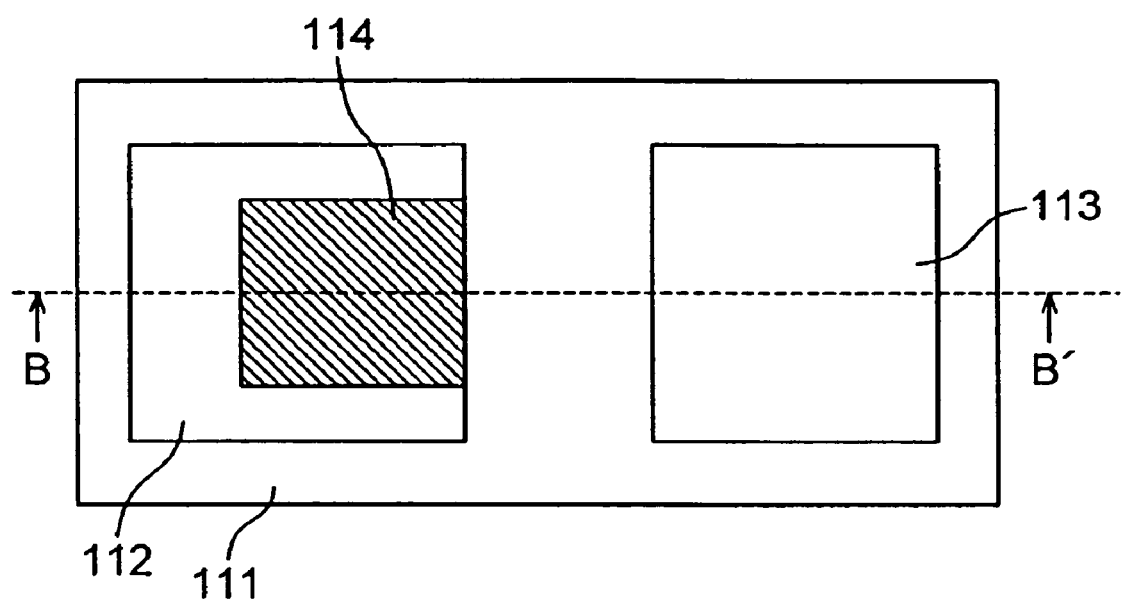
FIGS. 9A and 9B each are a typical view illustrating a formation of an electron emission device having a carbon fiber.
Figure 9B:
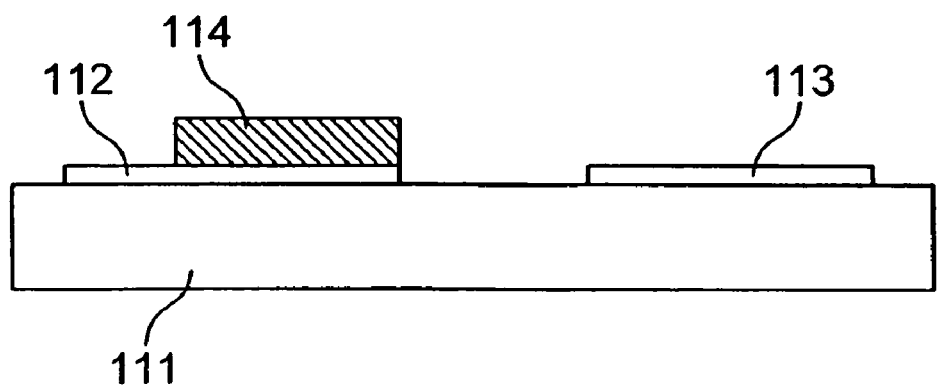

FIG. 9A is a plan view of the lateral type electron emission device, and FIG. 9B is a sectional view taken along a line B-B' of FIG. 9A. In FIGS. 9A and 9B, a reference numeral 111 denotes a substrate, 112 denotes a first electrode (cathode electrode), 113 denotes a second electrode (control electrode), and 114 denotes multiple carbon fibers which are an electron emission material. Incidentally, there are also cases where the second electrode (control electrode) 113 is made to function as the so-called "gate electrode" (the electrode for drawing electrons out from the carbon fibers 114). However, there are also cases where, as already stated in connection with the explanation of the vertical type electron emission device, drawing-out of electrons from the carbon fibers 114 is performed with the anode electrode (not illustrated) while, on the other hand, the second electrode (control electrode) 113 is used to perform the modulation of the emission amount of electrons from the carbon fibers 114, the halting of the electron emission, or the shaping of the electron beams emitted such as the convergence of the electron beam emitted.

Figure 10A:
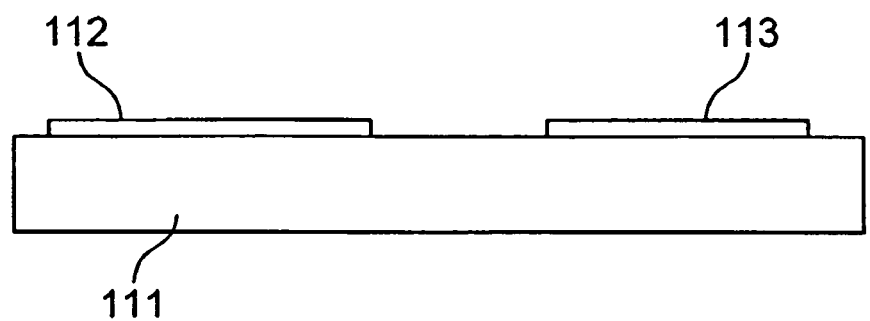
FIGS. 10A, 10B, and 10C each are a typical view illustrating a process of manufacturing the electron emission device having a carbon fiber.
Figure 10B:
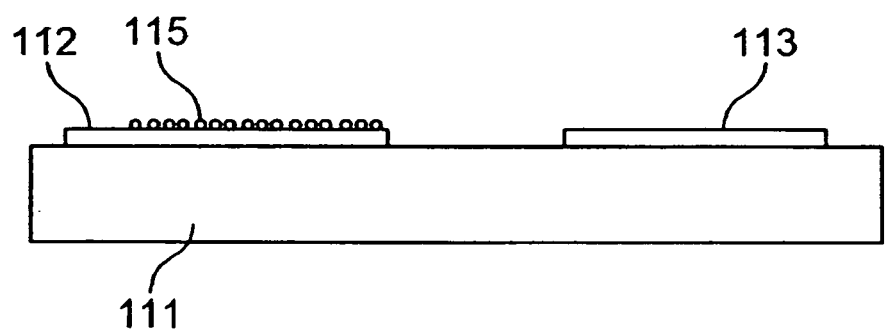
Figure 10C:
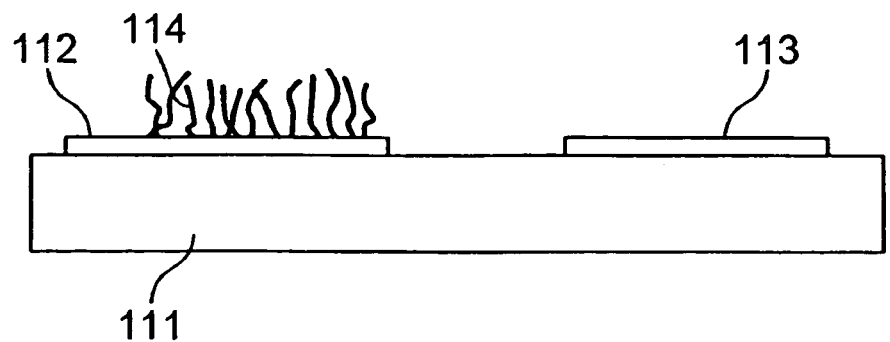

Also, in FIGS. 10A to 10C, there is typically illustrated an example of the manufacturing method for the lateral type electron emission device according to this embodiment. Hereinafter, this example of the manufacturing method for the lateral-type electron emission device according to the invention along the illustrations made in FIGS. 10A to 10C.

(Step A)

A substrate 111 the surface of which has been sufficiently cleaned beforehand is prepared. As the substrate 111, there can be used, for example, quartz glass, a substrate from which there has been decreased the content of impurity such as Na, contained in the substrate, a glass wherein the Na contained in the substrate is partially replaced by K, a blue plate glass, a substrate prepared by laminating a $SiO_2$ layer on a substrate such as that made of silicon, or a substrate made of ceramics such as alumina.

And, on the above-described substrate 111, there are laminated the first electrode 112 serving as a cathode electrode and the second electrode 113 serving as the control electrode (FIG. 10A).

The material for use as the first and second electrodes 112 and 113 needs only to be an electrically conductive material, and is suitably selected from, for example, carbon, metal, nitride of metal, carbide of metal, boride of metal, semiconductor, and metal compound. Among them, heat-resisting materials such as carbon, metal, nitride of metal, and carbide of metal are preferable. Regarding the thickness of each of the electrodes 112 and 113, it is set to a range of from several tens of nm to several μm. Regarding the space between the electrodes 112 and 113, it is suitably set to a range of from several μm to several hundreds of μm. Preferably, in practical use, the space between the electrodes 112 and 113 is set at not less than 1 μm and not more than 100 μm. Depending on the material of the electrode 112, the above-described intermediate layer (not illustrated) is located at least on the electrode 112.

(Step B)

A catalyst 115 is disposed on the first electrode 112 (FIG. 10B). The catalyst 115, preferably, as illustrated, is disposed in the form of particles. In a case where in the above-described description (step A) an intermediate layer has been disposed on the electrode 112, the catalyst 115 is disposed on the intermediate layer.

As the disposition method for catalyst particles, a large number of catalyst particles can discretely be disposed on the first electrode 112 by, for example, preparing a liquid dispersion, beforehand, wherein catalyst particles have been dispersed into a dispersion medium (solvent) and coating this liquid dispersion onto the first electrode 112 and then eliminating the solvent by thermal decomposition of it. Or, optionally, by forming the catalyst layer, on the first electrode 112, as a thin film of several Å to several hundreds of Å through the use of a sputtering technique, etc. and adding heat to the catalyst layer to thereby aggregate it, it is also possible to dispose a large number of catalyst particles on the first electrode 112.

For the catalyst material, it is possible to use, as a nucleus for forming the carbon fibers, Fe, Co, Pd, Ni, or alloys formed of the materials selected from among these. Especially, if using Pd, or Ni, it is possible to produce a graphite nano-fiber at a low temperature (a temperature of 400° C. or more). When producing a carbon nano-tube using Fe or Co, the production temperature therefor needs to be 800° C. or more. Therefore, because producing a graphite nano-fiber material using Pd or Ni is possible at a low temperature, this use of Pd or Ni is preferable from the viewpoint, as well, of the effect upon other materials and the manufacturing cost. Also, especially, using an alloy of Pd and Co enables forming carbon fibers that have excellent electron emission property.

(Step C)

Next, if, as in the case of the above-described manufacturing method for carbon fibers according to this embodiment, in the device illustrated in, for example, FIG. 4, thermal CVD treatment is performed under the first partial pressure of the carbon-containing gas and further thermal treatment is performed under a carbon-containing gas partial pressure that is lower than the first partial pressure, multiple carbon fibers 114 are made to grow on the first electrode 112 (FIG. 10C). If wanting to grow in a simpler way, it is possible to do it by heating everything relevant including the whole substrate 111 in the gas containing therein the raw material for the carbon fibers 114.

As the carbon-containing gas, more suitably, a hydrocarbon gas is used. As the carbon-containing gas, it is also possible to use, for example, a hydrocarbon gas such as ethylene, methane, propane, propylene, etc., CO or $CO_2$ gas, or a vapor of an organic solvent such as ethanol, acetone, etc.

Through executing the above-described step, it is possible to form an electron emission device of this embodiment.

On the electron emission device illustrated in FIG. 9, obtained in the above-described step, in a vacuum atmosphere the vacuum degree of which has reached, for example, approximately $10^{-5}$ Pa, an anode electrode (anode) is provided at a position which has a height H of several mm measured from the substrate 111 and, between the electrode 112 and the anode, there is applied an anode voltage Va having a high level of several kV. And, between the electrode 112 and the electrode 113, there is applied an device voltage Vf which is a pulse voltage having a level of several +V or so. As a result of this, electrons are given forth from the carbon fibers 114 and these electrons are caught by the anode electrode.

Hereinafter, an example of an electron source constructed by disposing multiple ones of the electron emission devices, described above, of this embodiment will be explained using FIG. 12.

Figure 12:
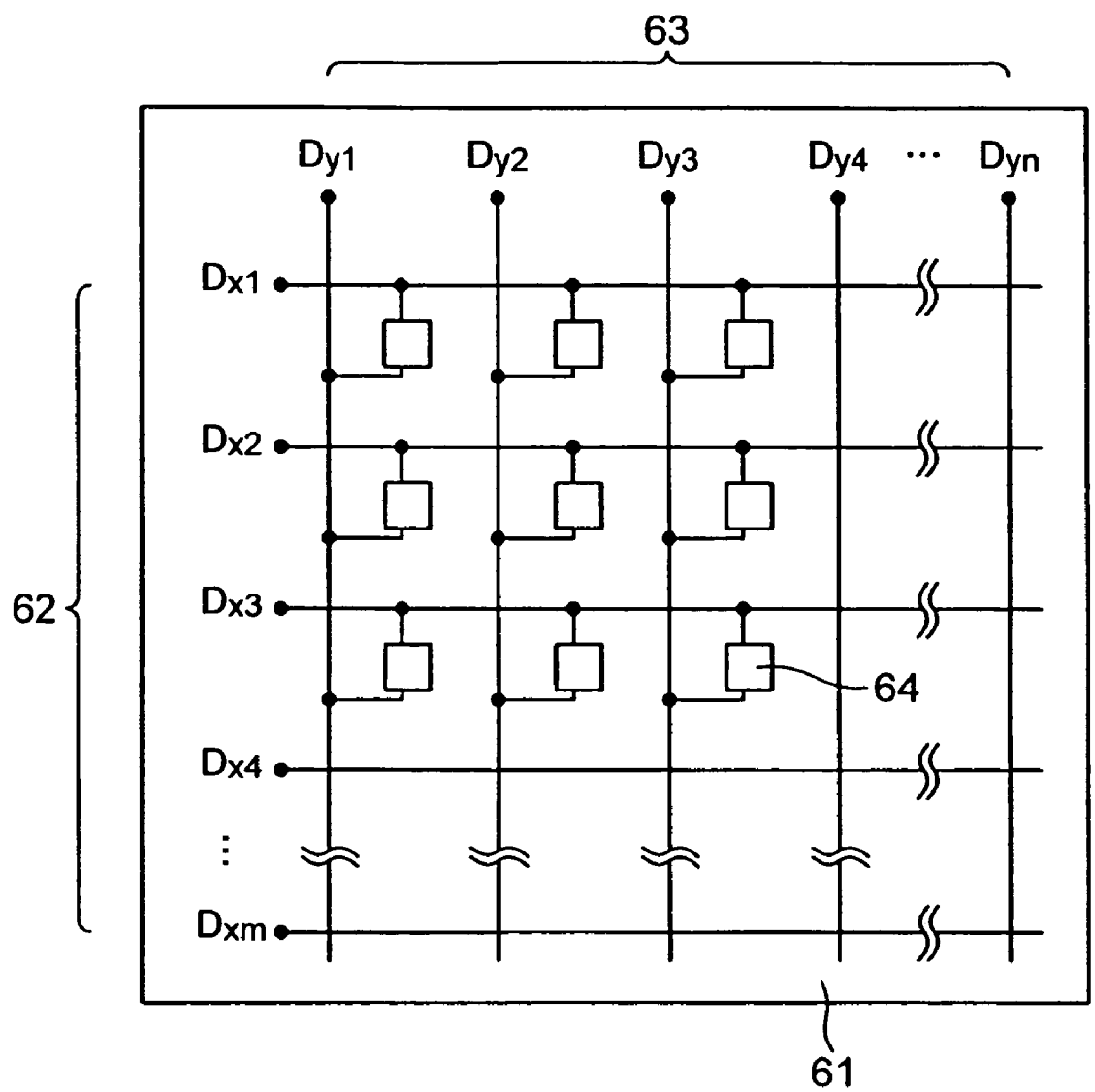
FIG. 12 is a typical view illustrating an electron source substratum having disposed thereon multiple electron emission devices that use carbon fibers.

In FIG. 12, a reference numeral 61 denotes an electron source substratum, 62 denotes an X-directional wiring, and 63 denotes a Y-directional wiring. A reference numeral 64 denotes the above-described electron emission device.

The X-directional wiring 62 comprises an m number of Dx1, Dx2, . . . Dxm pieces of distributed wires and can be constructed using electrically conductive material that has been formed using vacuum deposition technique, printing technique, sputtering technique, etc. The material, thickness, and width of the distributed wire are suitably designed. The Y-directional wiring 63 comprises an n number of Dy1, Dy2, . . . Dyn pieces of distributed wires and can be formed in the same way as that in which the X-directional distributed wires 62 are formed (the m and n each are a positive integer).

Between the X-direction wiring 62 whose wires are m in number and the Y-directional wiring 63 whose wires are n in number, there is provided an inter-layer insulation layer, not illustrated, which separates the both wiring layers from each other. The inter-layer insulation layer not illustrated can be constructed using, for example, $SiO_2$ formed using vacuum deposition, printing, sputtering, etc. For example, the inter-layer insulation layer is formed, in a desired form, over the entire, or partial, surface of the electron source substrate 61 having formed thereon the X-directional wiring 62. Especially, in order that it can resist the potential difference at the portions of intersection between the X-directional wiring 62 and the Y-directional wiring 63, the film thickness, material, process are suitably determined.

The above-described first electrode and second electrode (not illustrated) composing the electron emission device 64 each are electrically connected to the X-directional wiring 62 and to the Y-directional wiring 63. With this construction, it is possible to drive a desired one or ones of the electron emission devices.

Figure 13:
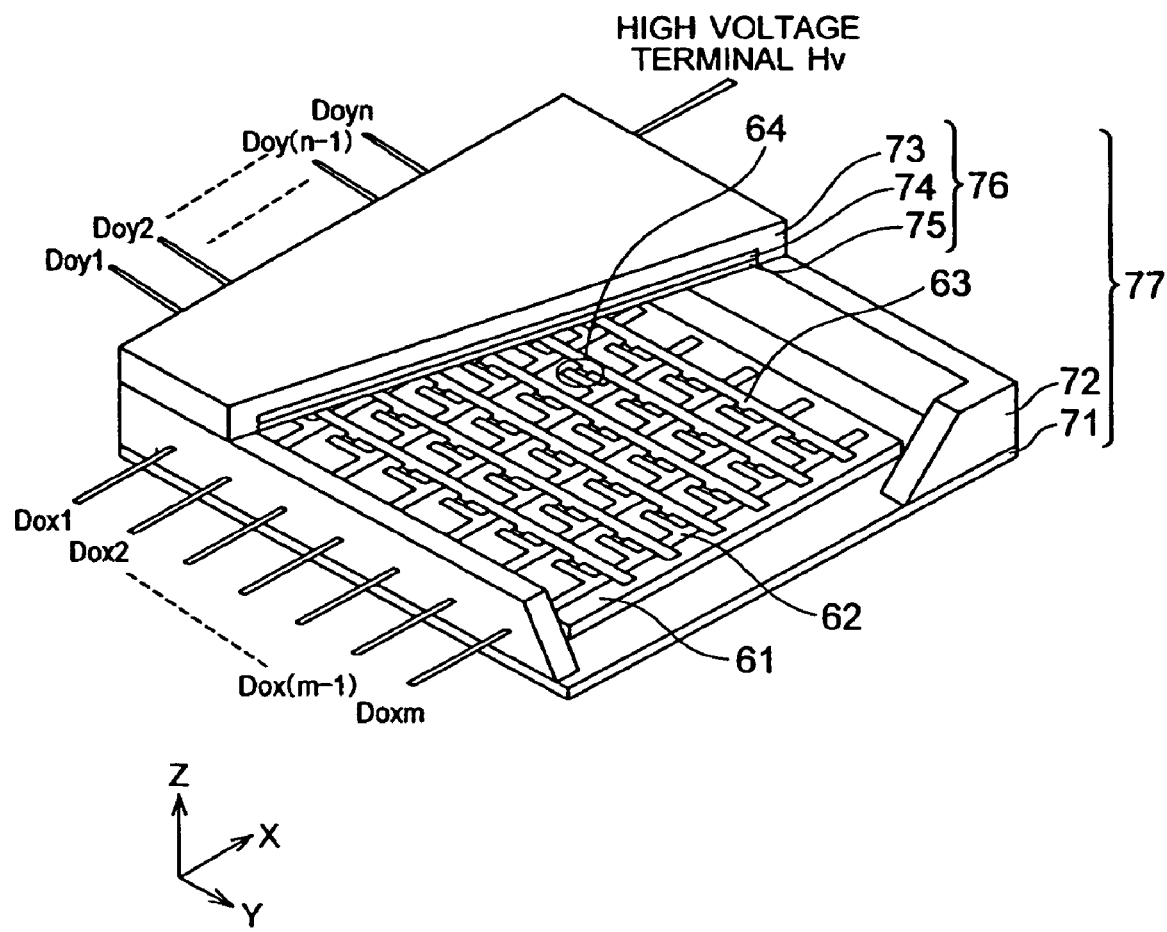
FIG. 13 is a typical view illustrating an image display apparatus that uses the electron source substratum.

Next, an example of an image display apparatus that has been constructed using the above-described electron source having the matrix disposition will be explained using FIG. 13. FIG. 13 is a typical view illustrating a display panel with a screen.

In FIG. 13, a reference numeral 61 denotes an electron source substratum having disposed thereon the above-described electron source; 71 denotes a rear plate having fixed thereonto the electron source substratum 61; 76 denotes a face plate having a glass base member 73 whose inner surface has formed thereon a phosphor film 74, and a metal back 75, and the like. Reference numeral 72 denotes a supporting frame. The phosphor film 74 disposed on this face plate 76 composes the screen for displaying an image.

The supporting frame 72, rear plate 71, and face plate 76 are connected together using an adhesive such as frit glass to compose the display panel 77. In the display panel 77, it is constructed in such a way as its joined portions are sealed together using an adhesive, by being baked in, for example, the atmosphere, vacuumed space, or in nitrogen in a temperature range of from 400 to 500° C. for 10 minutes or longer. As the adhesive, it is possible to use, for example, frit glass, indium, etc.

The display panel 77, as mentioned above, is constructed of the face plate 76, supporting frame 72, and rear plate 71. The rear plate 71 is provided, mainly, for the purpose of reinforcing the strength of the electron source substratum 61, and therefore, in a case where the electron source substratum 61 itself has a sufficiently high level of strength, the use of a separate rear plate 71 is unneeded. Namely, the face plate 76, supporting frame 72, and electron source substratum 61 may compose the display panel 77.

On the other hand, between the face plate 76 and the rear plate 71, a supporting member not illustrated, called "a spacer", may be installed. By doing so, it is also possible to compose the display panel 77 having a sufficiently high strength with respect to the atmospheric pressure.

Also, using the display panel of the invention explained using FIG. 13, an information display/reproduction apparatus can be composed.

Concretely, the information displaying/playing apparatus comprises a receiver device for receiving a broadcasting signal such as that from a television broadcasting, and a tuner for selecting from the broadcasting station signals that have been received. By this, at least one of the image information, character information, and voice information contained in the signal that has been selected is output to the screen and is thereby displayed and/or played. With this construction, it is possible to compose the information displaying/playing apparatus such as a television. Of course, when a broadcasting signal is encoded, the information displaying/playing apparatus of the invention can include a decoder. Also, regarding the voice signal, it is output to voice reproduction means, such as a speaker, that has been separately provided and is reproduced in synchronism with the image information or character information that is displayed on the display panel 77.

Also, as the method of outputting image information or character information to the display panel 77 and displaying and/or playing it on the screen, there is, for example, the following method. First, from the image information or character information that has been received, there is produced an image signal that corresponds to a respective pixel of the display panel 77. Then the image signal that has been produced is input to a drive circuit for the display panel 77. Then, according to the image signal that has been input to the drive circuit, there is controlled a voltage applied to a respective electron emission device within the display panel 77, to display a relevant image.

Figure 14:
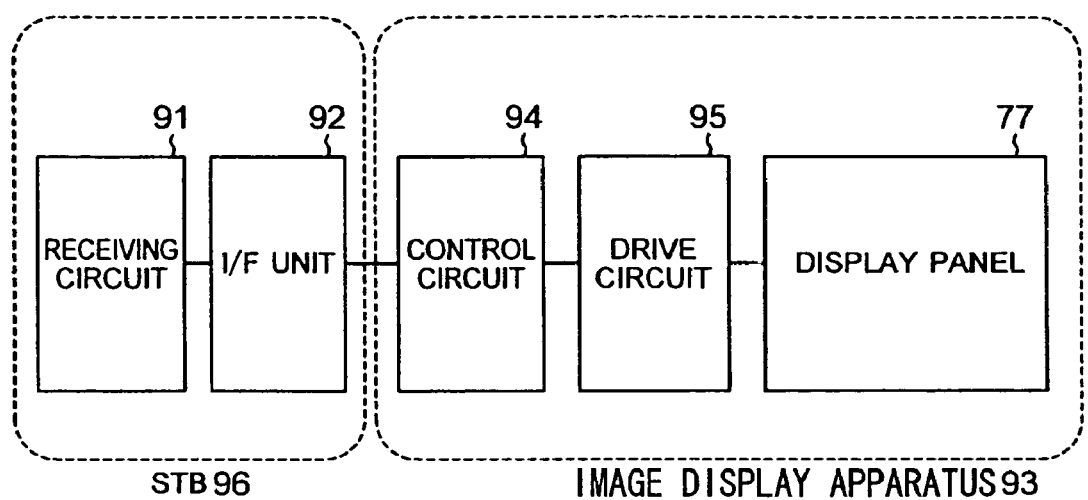
FIG. 14 is a typical view of an example of an information displaying/playing apparatus according to the invention.

FIG. 14 is a block diagram of a television apparatus according to the present invention. A receiving circuit 91 is comprised of a tuner, a decoder, etc. It receives a television signal such as satellite broadcasting and ground waves, data broadcasting that is transmitted on by way of the network, etc. and outputs image data that has been decoded to an I/F unit (the interface unit) 92. The I/F unit 92 converts the image data into a display format for an image display apparatus 93 and outputs the image data to the above-described display panel 77. The image display apparatus 93 comprises the display panel 77, control circuit 94, and drive circuit 95. The control circuit 94 performs image processing, such as correction processing, which suits the display panel 77, with respect to the image data that has been input thereto and outputs the image data and various kinds of control signals to the drive circuit 95. The drive circuit 95, according to the image data that has been input thereto, outputs a drive signal to a respective distributed wire (see the Dox1 to Doxm and Doy1 to Doyn of FIG. 13) of the display panel 77, thereby a television image is displayed. The receiving circuit 91 and I/F unit 92 may be accommodated within a housing that is separate from the image display apparatus 93 as a set top box (STB) 96, or may be accommodated within the same housing as that in which the image display apparatus 93 is accommodated.

Also, the interface part can also be constructed in such a manner as it can be connected to an image recorder, or image output device, such as a printer, digital video camera, digital camera, hard disk drive (HDD), digital video disk (DVD), etc. And, if doing like this, it is possible to construct an information displaying/playing apparatus (or a television) that enables displaying on the display panel 77 an image that has been recorded into the image recorder or that also enables processing an image displayed on the display panel 77 according to the necessity and outputting the resulting image to the image output device.

The construction of the information displaying/playing apparatus stated here is only illustrative but the invention permits various modifications to be made on the basis of the technical idea of the invention. Also, the information displaying/playing apparatus of the invention can be configured into various types of ones by connecting each of them to a television conference system, a computer system, etc.

Hereinafter, Examples of the invention will be explained in detail.

EXAMPLE 1

In this Example 1, the manufacturing method of the invention was applied to the substrate having a catalyst formed thereon to thereby form multiple carbon fibers, and these carbon fibers were used as emitter material.

First, an explanation will be given of the manufacturing method for a substrate equipped with a catalyst.

(Step 1)

In this Example, a quartz substrate was used as the substrate. In this Example, since it is necessary to use electrical connection means for electrical connection with carbon fibers in order to evaluate the electron emission property, there is formed on the substrate an electrode made of TiN the thickness of which is 200 nm.

(Step 2)

The proportion of and the conditions for sputter target are adjusted so that Pd may contain approximately 50 atomic percent of Co, thereby a catalyst layer is formed on the TiN electrode so that it has a thickness of 2.5 nm.

(Step 3)

Using a photo-resist, multiple resist patterns each having an area of 3 mm×10 mm are formed on the catalyst layer. Subsequently, patterning of the catalyst layer is performed by performing dry etching by using Ar and under a pressure of several Pa, after which the resist parts are exfoliated.

(Step 4)

The above-described substrate is disposed in a reducing furnace (this is used concurrently with the reaction vessel 10 for thermal CVD illustrated in FIG. 4), then, after evacuation thereof, the resulting mass is put into a furnace kept heated at approximately 600° C. using a gas containing therein hydrogen, and then several tens of minutes of heating is performed. By doing so, the Pd—Co layer is reduced and aggregated to thereby form the catalyst layer 3 comprising active catalyst particles (FIG. 3A). Incidentally, in FIG. 3A, a reference numeral 1 denotes the substrate, which in this Example is quartz glass. A reference numeral 2 denotes an electrically conductive layer (electrode) consisting of TiN, and a reference numeral 3 denotes the catalyst layer having a large number of catalyst particles (Pd—Co). The catalyst particles are constructed of an alloy wherein the proportion between Pd and Co is 50 atm %. Also, the catalyst particles are disposed more than one particle on the conductive layer (TiN electrode) 2, and the catalyst particles are disposed in such a manner as they are spaced away from one another.

Next, in the above-described reaction vessel 10 composing a thermal CVD apparatus (FIG. 4), there is disposed the substrate 1 that experienced the above-described steps 1 to 4 to thereby form multiple carbon fibers 4 on the conductive layer 4 by using the catalyst particles. The members denoted by the respective reference symbols are the same as those stated previously unless otherwise particularly noted.

In this Example, the heat source denoted by the reference numeral 11 is an infrared ray lamp, a reference numeral 18 denotes a Baratron vacuum gage for gauging the total pressure within the vessel, a reference numeral 20 denotes a cylinder having accommodated therein 1% of acetylene (99% of helium), 30 denotes a cylinder having accommodated therein a high-purity hydrogen, and 22 and 32 respectively denote control devices called "mass flow controllers" that operate with respect to the gas.

(Step 5)

The valve 14 is opened, then the interior of the reaction vessel 10 is evacuated by the vacuum evacuation device 15 down to a pressure of $1\times10^{-4}$ Pa or so.

(Step 6)

Next, the valves 31 and 33 were opened, then the flowrate of hydrogen that serves as a dilution gas was controlled with the control device 32, and then the dilution gas of 5 sccm was introduced into the reaction vessel 10.

The flowrate of the dilution gas and the conductance of the valve 14 were appropriately adjusted so that the total pressure of the interior of the reaction vessel 10 may be 532 Pa. Subsequently, an electric power that is applied to the heating mechanism of the heat source 11 was adjusted so that the temperature of the substrate 1 was approximately 600° C.

(Step 7)

Next, while the temperature of the substrate 1 was being maintained at approximately 600° C., the valves 21 and 23 were opened, then the flowrate of the carbon-containing gas was controlled with the control device 22, and then 1% of acetylene (99%: helium) was introduced 1ccm into the reaction vessel 10, to thereby commence causing the growth of the carbon fibers 4. The growing amount of time in this step is 1 minutes. Incidentally, at this time, the partial pressure of acetylene that is measured with the quadruple-polar mass analyzer 17 was 1 Pa.

(Step 8)

Subsequently, while the temperature of the substrate 1 was being maintained at approximately 600° C., the flowrate of the carbon-containing gas was controlled with the control device 22, then 1% of acetylene (99%: helium) was introduced 0.02 ccm into the reaction vessel 10, to thereby keep causing the growth of the carbon fibers 4. The amount of time for growth in this step is 10 minutes. Incidentally, at this time, the partial pressure of acetylene that is measured with the quadruple-polar mass analyzer 17 was 0.05 Pa.

(Step 9 (the Step for Terminating the Growth))

While the temperature of the substrate 1 is maintained at approximately 600° C., the valves 21 and 23 are closed and, simultaneously with stopping the introduction of the carbon-containing gas, the valve 14 is opened, and then the interior of the reaction vessel 10 is evacuated, with the vacuum evacuation device 15, down to a pressure of 100 Pa or less to thereby stop causing the growth of the carbon fibers 4. At this time, the partial pressure of acetylene that is measured with the quadruple-polar mass analyzer 17 was 0.0001 Pa or less. Thereafter, the heating mechanism of the heat source 11 is turned OFF to cool the substrate 1.

During a time period in which the carbon fibers 4 were grown, the minute-flowrate valve 16 was opened and the partial pressure of the carbon-containing gas components was measured (in this Example the partial pressure was determined by gauging the partial pressure of the hydrogen and acetylene and conversion-calculating from the value of the total pressure from the Baratron vacuum gage 18.). The partial pressure of the carbon-containing gas component, since in the step 8 of this Example 1 the flowrate of the carbon-containing gas was changed over to one tenth of that in the step 7, this partial pressure was gradually decreased from immediately after that flowrate was decreased in such a profile as illustrated in FIG. 5A.

The carbon fibers 4 that were produced in the way described above were observed using a scanning type electron microscope (SEM). As a result of this, the carbon fibers 4 were uniformly grown in the region where the catalyst layer 3 was formed. When the substrate 1 having grown thereon the carbon fibers 4 was observed from the sectional direction of the substrate 1 and the average thickness of the multiple carbon fibers 4 was calculated for estimation, the thickness was 2 μm. Incidentally, the average thickness of the multiple carbon fibers 4 can be regarded as being the average value taken at the positions of the respective carbon fibers 4 that are the remotest from the surface of the conductive layer (TiN electrode).

As Comparative Example 1, without executing the step 8, by adjusting the amount of time for the growth of the carbon fibers (thermal CVD processing time length) in the step 7, the multiple carbon fibers were manufactured on the electrode to a thickness of 2 μm as in the case of the carbon fibers 4 manufactured in Example 1. And, these carbon fibers 4 were compared with those carbon fibers 4 manufactured in this Example 1 in respect of the electron emission property.

When evaluating the electron emission property, a negative pole of a DC power source was connected to the conductive layer (TiN electrode) 2. And, at a position upper 200 μm from the substrate 1, there was disposed a transparent conductive film (anode electrode), then to this anode electrode there was connected a positive pole of the DC power source to thereby evaluate the electron emission property (the one viewed from the electrical point of view, expressed as the characteristic of the electron emission current with respect to the anode voltage). Also, with the anode voltage being kept fixed, it was maintained as was for a long period of time to thereby examine a change with time of the emission current. Incidentally, in order to avoid the concentration of an electric field on the region where a number of the carbon fibers were formed, the disposition position for the anode electrode was contrived so that the anode electrode, when viewed from above the substrate, fell inside the region where the carbon fibers were formed (so that the orthogonal projection of the anode electrode onto the surface of the substrate fell inside the region where the carbon fibers were formed.).

As a result of this, compared to the carbon fibers manufactured in Comparative Example 1, the carbon fibers 4 manufactured in this Example 1 exhibited less change with time of the emission current and exhibited a longer life.

Figure 5C:
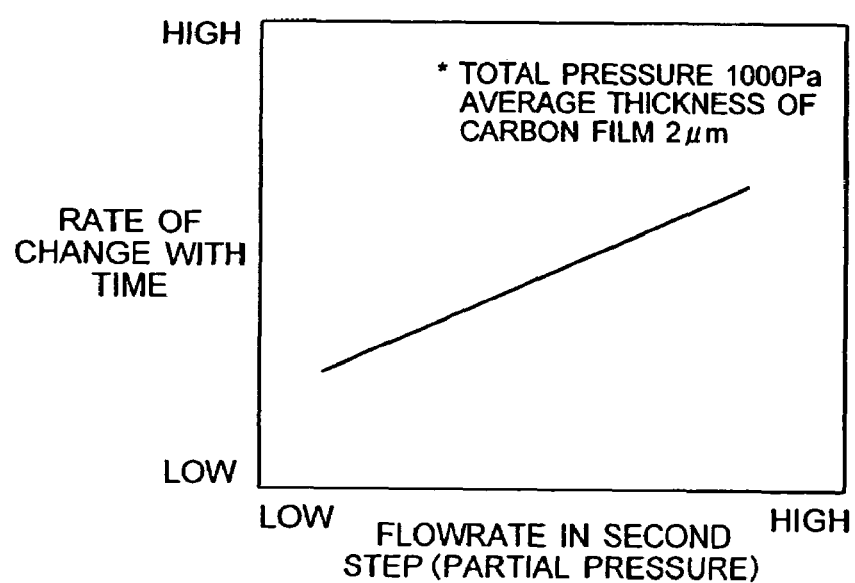
FIG. 5C is a typical view illustrating the relationship between the effect of the present invention and the manufacturing conditions according to a first embodiment of the invention.

Also, FIG. 5C is a view associated with the carbon fibers which up to the step 7 of this Example 1 are manufactured using completely the same method as in Example 1 and which are altered in terms of the flowrate of the carbon-containing gas and the growing amount of time in the step 8 so that the carbon fibers may have an average thickness of 2 μm. In FIG. 5C, the ordinate axis represents the rate of change in the emission current with respect to the time passage, in a case where evaluating the life characteristic using the above-described method, and along the abscissa axis there is plotted the flowrate of the carbon-containing gas of the step 8. As illustrated in FIG. 5C, it is seen that the carbon fibers that have been gently grown by lessening the flowrate exhibit a lower rate of change in the emission current with time passage and also exhibit more excellent life characteristic.

Incidentally, it should be noted here that the step 8 of this Example is not the step that finishes the growth step for the carbon fibers but is the step, to the last, that make gentle (slow) the growth rate for the carbon fibers.

Also, as Comparative Example 2, there was observed using the SEM the following substrate 1 in the step 7 of the Example 1. The total pressure within the reaction vessel 10 was set to be 532 Pa, 1% of acetylene (99%: helium) was introduced 0.02 ccm into the reaction vessel 10 from the outset to start the growth, and during the growth the partial pressure of acetylene that was measured using the quadruple-polar mass analyzer 17 was set to be 0.05 Pa to thereby cause the growth of the carbon fibers 4 on that substrate 1. When the observation thereof was made, on even the region having the catalyst layer 3 formed thereon, the carbon fibers 4 were only sparsely grown. The region (area) where the catalyst particles remained to exist was noticeable.

Also, when having observed the TEM image of the end, on a side being not fixed to the substrate 1, of the carbon fibers 4 that were manufactured in this Example, a structure that is illustrated in FIG. 2C1 was observed.

Also, one piece of the carbon fibers 4 that were manufactured in this Example was taken out to measure the Raman spectrum of this piece of carbon fiber 4. In the end, on a side being not fixed to the substrate 1, of the carbon fibers that were manufactured in this Example, there was satisfied the relationship of $h2_1 \geq h1_1 \times 1.5$, $h3_1 \leq h1_1/2$, $E1_1 \leq 100$ kaysers, $E2_1 \leq 100$ kaysers. More specifically, $h2_1 = h1_1 \times 1.8$, $h3_1 = h1_1/3$, $E1_1 = 75$ kaysers, and $E2_1 = 75$ kaysers.

Also, between the h3 value ($h3_1$) at the end on a side being not fixed to the substrate 1 and the h3 value ($h3_2$) at the portion on a side fixed to the substrate 1, it was admitted that there was established the relationship of $(h3_2-h3_1)/h3_2 \times 100 \geq 40$ (%).

On the other hand, regarding the carbon fibers that were manufactured in Comparative Example 1, when having measured the carbon fibers 4 in the same way as in this example, $(h3_2-h3_1)/h3_2 \times 100$ had a value of approximately 0.

EXAMPLE 2

(Step 1)

In the same way as in the case of the steps 1 to 5 of Example 1, the substrate having a catalyst layer thereon was disposed in the reaction vessel 10, which then was evacuated.

(Step 2)

Next, the valves 31 and 33 were opened, then the flowrate of hydrogen that serves as a dilution gas was controlled with the control device 32, and then the dilution gas of Ssccm was introduced into the reaction vessel 10.

The flowrate of the dilution gas and the conductance of the valve 14 were appropriately adjusted so that the total pressure of the interior of the reaction vessel 10 may be 100000 Pa. Subsequently, an electric power that is applied to the heating mechanism of the heat source 11 was adjusted so that the temperature of the substrate 1 was approximately 600° C.

(Step 3)

Next, while the total pressure of the interior of the reaction vessel 10 was being maintained as 100000 Pa and the temperature of the substrate 1 was being maintained at approximately 600° C., the valves 21 and 23 were opened, then the flowrate of the carbon-containing gas was controlled with the control device 22, and then 1% of acetylene (99%: helium) was introduced 0.1 ccm into the reaction vessel 10, to thereby commence causing the growth of the carbon fibers 4. The growing amount of time in this step is 1 minute. Incidentally, at this time, the partial pressure of acetylene that is measured with the quadruple-polar mass analyzer 17 was 20 Pa.

(Step 4)

Subsequently, while the temperature of the substrate 1 was being maintained at approximately 600° C. and while the flowrate of the carbon-containing gas was also maintained at 0.1 ccm, the conductance of the valve 14 was adjusted and the total pressure within the reaction vessel 10 was decreased down to a pressure of 532 Pa to thereby cause the carbon fibers 4 to continue to grow. The amount of time for growth in this step is 10 minutes. Incidentally, at this time, the partial pressure of acetylene that is measured with the quadruple-polar mass analyzer 17 was 0.1 Pa.

(Step 5 (the Step for Terminating the Growth))

While the temperature of the substrate 1 is maintained at approximately 600° C., the valves 21 and 23 are closed and, simultaneously with stopping the introduction of the carbon-containing gas, the valve 14 is opened, and then the interior of the reaction vessel 10 is evacuated, with the vacuum evacuation device 15, down to a pressure of 10 Pa or less to thereby stop causing the growth of the carbon fibers 4. Thereafter, the heating mechanism of the heat source 11 is turned OFF to cool the substrate 1.

Regarding the carbon fibers 4 manufactured in this Example, the electron emission property thereof was evaluated in the same was as that in which that property was so done in Example 1, and, as a result, the property that the life is long was obtained.

Also, one piece of the carbon fibers 4 that were manufactured in this Example was taken out to measure the Raman spectrum of this piece of carbon fiber 4. In the end, on a side kept out of being fixed to the substrate 1, of the carbon fibers that were manufactured in this Example, there was satisfied the relationship of $h2_1 \geq h1_1 \times 1.5$, $h3_1 \leq h1_1 1/2$, $E1_1 \leq 100$ kaysers, and $E2_1 \leq 100$ kaysers.

EXAMPLE 3

In this Example, as typically illustrated in FIG. 12, there was fabricated the electron source substratum 61 having disposed in the form of a matrix a large number of the electron emission devices 64 each having multiple carbon fibers 4. Dx1 to Dxm in FIG. 12 represent an m number of the X-directional wired wires 62, and Dy1 to Dyn represent an n number of the Y-directional wired wires 63. The structure of each electron emission device 64 is illustrated as typical sectional views in FIGS. 9A and 9B. In FIGS. 9A and 9B, a reference numeral 111 denotes a substrate, 112 denotes a first electrode (cathode electrode), 113 denotes a second electrode (control electrode), and 114 denotes multiple carbon fibers which are disposed on the first electrode (cathode electrode) 112. The manufacturing method for carbon fibers was executed using the same method as that which was executed in Example 1.

This electron emission device 64 is of a type that draws electrons out from the carbon fibers 114 by applying to the second electrode (control electrode) 113 a potential that is higher than that of the first electrode (cathode electrode) 112. Accordingly, the second electrode (control electrode) 113 can also be called "the gate electrode" or "the draw-out electrode".

The first electrode (cathode electrode) 112 of each electron emission device is connected to one piece of the X-directional wired wire while the second electrode (control electrode) 113 is electrically connected to one piece of the Y-directional wired wire. By providing this matrix wiring, it is possible to select a given one of the electron emission devices 64 and to cause emission of electrons from the electron emission device 64 that has been selected.

The electron source of this Example can be manufactured, for example, as follows.

(Step 1)

A unit comprised of the first electrode (cathode electrode) 112 and the second electrode (control electrode) 113 is formed more than one piece on the substrate 111 in the form of a matrix.

(Step 2)

Multiple X-directional wired wires each having commonly connected thereto the multiple first electrodes (cathode electrodes) 112 and multiple Y-directional wired wires each having commonly connected thereto the multiple second electrodes (control electrodes) 113. Each wired wire can be formed using, for example, a photolithography or printing method.

(Step 3)

On each first electrode (cathode electrode) 112, there are disposed multiple catalyst particles in the same manner as that in which they were disposed in Example 1.

(Step 4)

The substrate 111 that was obtained in the above-described step 3 is subjected to thermal CVD treatment within the reaction vessel 10 illustrated in FIG. 4 in the same way as that in which the substrate was subjected thereto in the method of Example 1. By doing so, the multiple carbon fibers 114 are grown on the respective first electrode (cathode electrode) 112.

When applying a voltage to the electron source of this Example formed like that while sequentially switching to the X-directional wired wires Dx1 to Dxm and, on the other hand, simultaneously, applying a modulation voltage to the Dy1 to Dyn (performing so-called "line-sequential drive"), electron emission could be obtained with a high level of uniformity from each electron emission device 64. In addition, the deterioration in the emission current was less.

EXAMPLE 4

In this Example, there was manufactured a flat panel display typically illustrated in FIG. 13. In FIG. 13, a reference numeral 71 denotes a rear plate having formed thereon multiple pieces of the electron emission devices 64 formed in Example 3, a reference numeral 76 denotes a face plate having a light emission part that is comprised of a layer consisting of a phosphor of three primary colors (red, blue, and green) and a metal back serving as the anode electrode, a reference numeral 72 denotes a supporting frame that keeps the spacing between the face plate 76 and the rear plate 71. The joining portions between the supporting frame 72 and the face plate 76 and between the supporting frame 72 and the rear plate 71, each, are joined together by using an adhesive agent consisting of frit. And, the interior is maintained at a vacuum degree of $10^{-5}$ Pa or more.

In the flat panel display manufactured in this Example, when each electron emission device 64 has been driven by individually controlling it, a display image that has a high uniformity and less change with age could be obtained.

EXAMPLE 5

Figure 15:
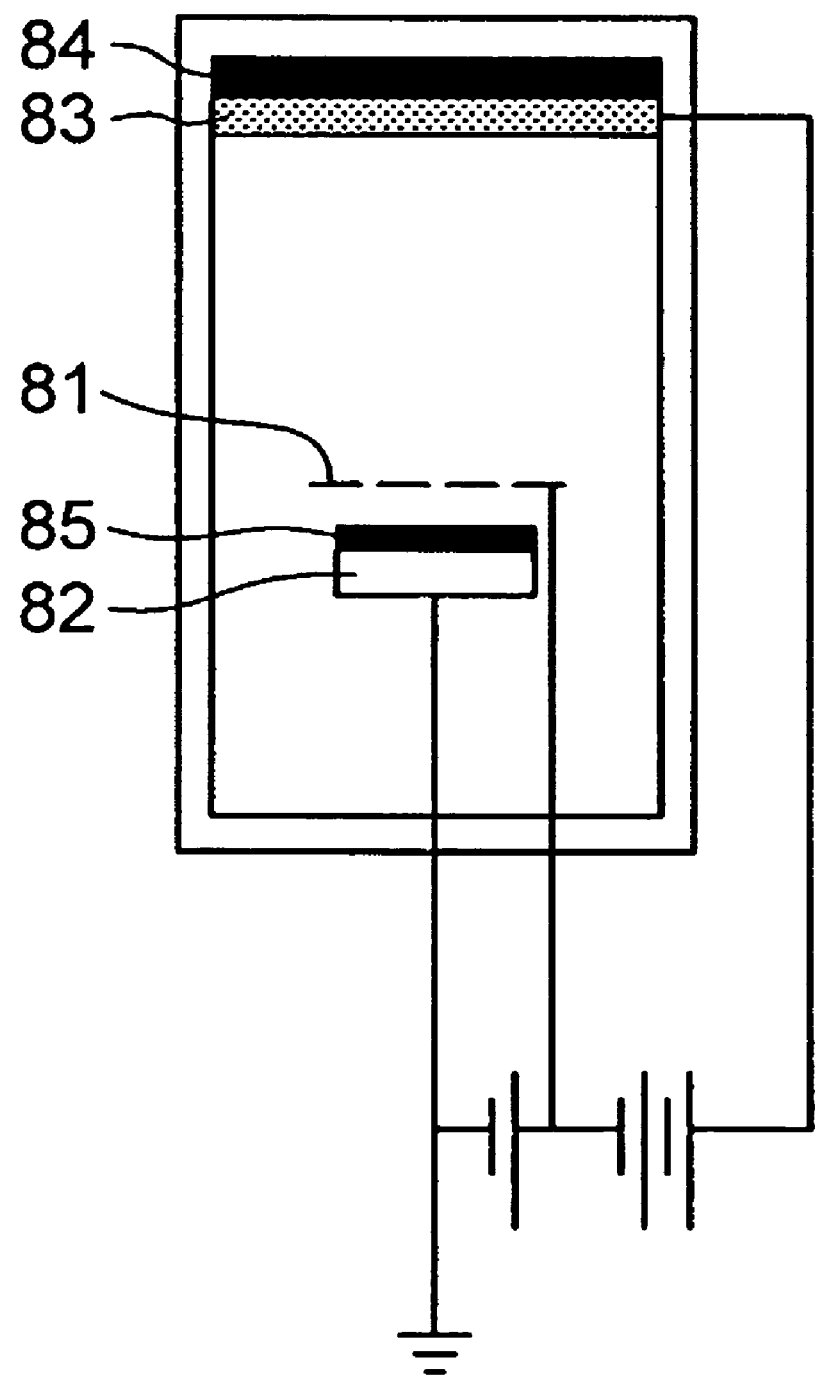
FIG. 15 is a typical view illustrating a light bulb that uses a carbon fiber.

In this Example, a light bulb illustrated in FIG. 15 was formed. In FIG. 15, a reference numeral 81 denotes a grid electrode, which plays the role of drawing electrons out from a number of the carbon fibers 85. A number of these carbon fibers 85 were formed on an electrode (not illustrated) disposed on the surface of the substrate 82, in the same way as that in which they were formed in Example 2. A reference numeral 83 denotes an anode electrode consisting of aluminium, and a reference numeral 84 denotes a phosphor film that emits a light having a desired color. In this Example, there was used a phosphor film 84 that consisted of phosphor particles that emit a green-color light.

When the interior of the light bulb of this Example was maintained at $10^{-5}$ Pa more and a voltage of 10 kV was applied between the anode electrode 83 and the electrode of the substrate 82, there could be obtained a light whose uniformity was high over the entire surface of the phosphor film 84 and whose change with age was less.

This application claims priority from Japanese Patent Applications No. 2003-420723 filed Dec. 18, 2003, and No. 2004-329121 filed Nov. 12, 2004, which are hereby incorporated by reference herein.

What is claimed is:

1. A fiber containing carbon having both ends in its longitudinal direction, wherein the degree of crystallinity at one of the both ends is higher than a degree of crystallinity at the other portions, wherein, when in the Raman spectrum at the one end $h1_1$ represents the maximum value of the Raman scattered light intensity in a range of 1355±10 kayser and $h2_1$ represents the maximum value of the Raman scattered light intensity in a range of 1580±10 kayser, while when in the Raman spectrum at the other portions $h1_2$ represents the maximum value of the Raman scattered light intensity in a range of 1355±10 kayser and $h2_2$ represents the maximum value of the Raman scattered light intensity in a range of 1580±10 kayser, there is established the relationship:

$$(h1_1-h1_2)/h1_1 \times 100 \geq 20 \text{ and/or}$$

$$(h2_1-h2_2)/h2_1 \times 100 \geq 20.$$

2. A fiber containing carbon having both ends in its longitudinal direction, wherein the degree of crystallinity at one of the both ends is higher than a degree of crystallinity at the other portions, wherein, when in the Raman spectrum at the one end, $h3_1$ represents a local maximum value of the Raman scattered light intensity between the range of 1355±10 kayser and the range of 1580±10 kayser and in the Raman spectrum at the other portions $h3_2$ represents a local maximum value of the Raman scattered light intensity between the range of 1355±10 kayser and the range of 1580±10 kayser, there is established the relationship:

$$(h3_2-h3_1)/h3_2 \times 100 \geq 20.$$

3. A substrate having thereon multiple fibers containing carbon, wherein
   each of the fibers has both ends in its longitudinal direction, and one of the ends is not fixed to the substrate while the other end is fixed to the substrate,
   wherein a degree of crystallinity at the one of the ends is higher than a degree of crystallinity at other portions, and
   wherein, when in the Raman spectrum at the one end $h1_1$ represents the maximum value of the Raman scattered light intensity in a range of 1355±10 kayser and $h2_1$ represents the maximum value of the Raman scattered light intensity in a range of 1580±10 kayser, while when in the Raman spectrum at the other portions $h1_2$ represents the maximum value of the Raman scattered light intensity in a range of 1355±10 kayser and $h2_2$ represents the maximum value of the Raman scattered light intensity in a range of 1580±10 kayser, there is established the relationship:

$$(h1_1-h1_2)/h1_1 \times 100 \geq 20 \text{ and/or } (h2_1-h2_2)/h2_1 \times 100 \geq 20.$$

4. A substrate having thereon multiple fibers containing carbon, wherein
   each of the fibers has both ends in its longitudinal direction, and one of the ends is not fixed to the substrate while the other end is fixed to the substrate, wherein a degree of crystallinity at the one of the ends is higher than a degree of crystallinity at other portions, and wherein, when in the Raman spectrum at the one end, $h3_1$ represents a local maximum value of the Raman scattered light intensity between the range of 1355±10 kayser and the range of 1580±10 kayser and in the Raman spectrum at the other portions $h3_2$ represents a local maximum value of the Raman scattered light intensity between the range of 1355±10 kayser and the range of 1580±10 kayser, there is established the relationship:

$$(h3_2-h3_1)/h3_2 \times 100 \geqq 20.$$

5. An electron emission device comprising:

electron emission device including a fiber containing carbon having both ends in its longitudinal direction;

a cathode electrode; and a control electrode that is located at a position spaced away from the cathode electrode, wherein one end of said fiber is not fixed to the cathode electrode, and a degree of crystallinity of the one end of the fiber containing carbon is higher than that of other portions of the fiber.

6. An electron emission device according to claim 5, wherein, when in the Raman spectrum at the one end $h1_1$ represents the maximum value of the Raman scattered light intensity in a range of 1355±10 kayser and $h2_1$ represents the maximum value of the Raman scattered light intensity in a range of 1580±10 kayser, while when in the Raman spectrum at the other portions $h1_2$ represents the maximum value of the Raman scattered light intensity in a range of 1355±10 kayser and $h2_2$ represents the maximum value of the Raman scattered light intensity in a range of 1580±10 kayser, there is established the relationship:

$$(h1_1-h1_2)/h1_1 \times 100 \geqq 20 \text{ and/or } (h2_1-h2_2)/h2_1 \times 100 \geqq 20.$$

7. An electron emission device according to claim 6, wherein, when in the Raman spectrum at the one end, $h3_1$ represents a local maximum value of the Raman scattered light intensity between the range of 1355±10 kayser and the range of 1580±10 kayser and in the Raman spectrum at the other portions $h3_2$ represents a local maximum value of the Raman scattered light intensity between the range of 1355±10 kayser and the range of 1580±10 kayser, there is established the relationship:

$$(h3_2-h3_1)/h3_2 \times 100 \geqq 20.$$

8. An electron source, the electron source including a plurality of electron emission devices, wherein each of the plurality of electron emission devices is the one as set forth in claim 5.

9. A display panel, the display panel having an electron source and a screen constructed of a light-emitting member which emits light by irradiation of electrons emitted from an electron source, wherein the electron source is the one as set forth in claim 8.

10. An information displaying/playing apparatus comprising at least a display panel having a screen, a receiver unit that outputs at least one of image information, character information, and sound information contained in a broadcasting signal that has been received, and a drive circuit for displaying on the screen of the display panel the information that has been output from the receiver unit, wherein the display panel is the one as set forth in claim 9.

* * * * *